United States Patent
Tsunaka et al.

(10) Patent No.: US 10,000,607 B2
(45) Date of Patent: *Jun. 19, 2018

(54) METHOD FOR PRODUCING POLYAMIDE RESIN

(71) Applicant: Mitsubishi Gas Chemical Company, Inc., Tokyo (JP)

(72) Inventors: Nobuhide Tsunaka, Kanagawa (JP); Takafumi Oda, Kanagawa (JP); Jun Mitadera, Kanagawa (JP); Tomonori Kato, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 14/903,247

(22) PCT Filed: Jul. 2, 2014

(86) PCT No.: PCT/JP2014/067714
§ 371 (c)(1),
(2) Date: Jan. 6, 2016

(87) PCT Pub. No.: WO2015/005201
PCT Pub. Date: Jan. 15, 2015

(65) Prior Publication Data
US 2016/0376407 A1    Dec. 29, 2016

(30) Foreign Application Priority Data

Jul. 10, 2013  (JP) .................................. 2013-144759
Jul. 10, 2013  (JP) .................................. 2013-144771

(51) Int. Cl.
*C08G 69/28*  (2006.01)
*C08G 69/26*  (2006.01)
(Continued)

(52) U.S. Cl.
CPC .............. *C08G 69/28* (2013.01); *B29B 7/007* (2013.01); *B29B 7/482* (2013.01); *B29B 7/845* (2013.01);
(Continued)

(58) Field of Classification Search
None
See application file for complete search history.

(56) References Cited

U.S. PATENT DOCUMENTS 3,728,312 A    4/1973  Schneider et al.
5,079,307 A    1/1992  Taylor et al.
(Continued)

FOREIGN PATENT DOCUMENTS

CN      1592675 A       3/2005
CN    101346411 A       1/2009
(Continued)

OTHER PUBLICATIONS

International Search Report dated Sep. 16, 2014 for PCT/JP2014/067714 and English translation of the same (4 pages).
(Continued)

*Primary Examiner* — Rachel Kahn
(74) *Attorney, Agent, or Firm* — Fitch, Even, Tabin & Flannery LLP

(57) ABSTRACT

A polyamide resin is produced through polycondensation by melt-kneading a polyamide oligomer having a relative viscosity of from 1.1 to 1.3 and a water content of 3% by mass or less in a cylinder (S) of an extruder. The extruder includes open vents (OV1) and (OV2) and vacuum vents (V1) and (V2). The open vent (OV1) is arranged near a supply port (A3), e.g., above the supply port (A3), and a pressure-decreasing element (Y) is arranged on an upstream side with respect to positions of the vacuum vents (V1) and (V2). In
(Continued)

addition, the open vent (OV2) is arranged in a preceding area (OA) and is brought into a pressurized state.

20 Claims, 6 Drawing Sheets

(51) Int. Cl.
*C08L 77/06* (2006.01)
*B29B 7/00* (2006.01)
*B29B 7/48* (2006.01)
*B29B 7/84* (2006.01)
*B29C 47/60* (2006.01)
*B29C 47/64* (2006.01)
*B29C 47/76* (2006.01)
*B29C 47/92* (2006.01)
*B29C 47/00* (2006.01)

(52) U.S. Cl.
CPC ...... *B29C 47/6056* (2013.01); *B29C 47/6068* (2013.01); *B29C 47/64* (2013.01); *B29C 47/767* (2013.01); *B29C 47/92* (2013.01); *C08G 69/265* (2013.01); *C08L 77/06* (2013.01); *B29C 47/0004* (2013.01)

(56) References Cited

U.S. PATENT DOCUMENTS

| 5,663,284 | A | 9/1997 | Kominami et al. |
| 5,929,178 | A | 7/1999 | Shida et al. |
| 2003/0067089 | A1 | 4/2003 | Wang et al. |
| 2007/0142612 | A1 | 6/2007 | Davis et al. |
| 2007/0142618 | A1 | 6/2007 | Davis et al. |
| 2012/0065327 | A1 | 3/2012 | Ogawa et al. |
| 2013/0303367 | A1 | 11/2013 | Oda et al. |
| 2015/0166726 | A1 | 6/2015 | Ogawa et al. |

FOREIGN PATENT DOCUMENTS

| CN | 102449028 | A | 5/2012 |
| CN | 102596524 | A | 7/2012 |
| EP | 0410650 | A1 | 1/1991 |
| EP | 1405874 | A1 | 4/2004 |
| EP | 2975075 | A1 | 1/2016 |
| JP | S49-021115 | B1 | 5/1974 |
| JP | H3-81325 | A | 4/1991 |
| JP | H7-138363 | A | 5/1995 |
| JP | H07-188410 | A | 7/1995 |
| JP | H7-323462 | A | 12/1995 |
| JP | H8-3312 | A | 1/1996 |
| JP | H8-59825 | A | 3/1996 |
| JP | H08-109255 | A | 4/1996 |
| JP | H8-176298 | A | 7/1996 |
| JP | H8-197601 | A | 8/1996 |
| JP | H8-197609 | A | 8/1996 |
| JP | 2000-256461 | A | 9/2000 |
| JP | 2003-082095 | A | 3/2003 |
| JP | 2003-212992 | A | 7/2003 |
| JP | 2009-114429 | A | 5/2009 |
| JP | 2010-53359 | A | 3/2010 |
| JP | 2012-188557 | A | 10/2012 |
| JP | 5706788 | B2 | 4/2015 |
| WO | 2004/024795 | A1 | 3/2004 |
| WO | 2012/090797 | A1 | 7/2012 |

OTHER PUBLICATIONS

Extended European Search Report dated Feb. 7, 2017, in corresponding European Application No. 14823790.2 (8 pages).
Kobelco website, Kobe Steel, Ltd., Mar. 2012, 7 pages.

METHOD FOR PRODUCING POLYAMIDE RESIN

CROSS-REFERENCE TO RELATED APPLICATIONS

This application is a U.S. national phase application filed under 35 U.S.C. § 371 of International Application PCT/JP2014/067714, filed on Jul. 2, 2014, designating the United States, which claims priority from Japanese Application Number 2013-144759, filed Jul. 10, 2013 and Japanese Application Number 2013-144771, filed Jul. 10, 2013, which are hereby incorporated herein by reference in their entirety.

TECHNICAL FIELD

The present invention relates to a method of producing a polyamide resin from a polyamide oligomer using an extruder including an intermeshed co-rotation twin screw.

BACKGROUND ART

A polyamide has excellent mechanical properties and processability and has relatively high gas-barrier performance, and is therefore widely used not only for injection-molding materials for automobile parts, electric-electronic parts, and the like but also for packaging materials for foods, drinks, chemicals, electronic parts, and the like as well as for industrial materials. For example, a polyamide to be obtained through a polycondensation reaction of a xylylenediamine and an aliphatic dicarboxylic acid has high strength and a high elastic modulus and has low permeability for gaseous substances, such as oxygen, carbon dioxide gas, odor, and flavor, and is therefore widely used for gas-barrier materials in the field of packing materials. In addition, a polyamide has resistance and gas-barrier performance against alcohols, weakly-alkaline chemicals, weakly-acidic chemicals, fuels, various types of organic solvents, industrial gas, and the like, and is therefore also widely used for materials in the field of industrial application.

Various methods for production of polyamide resins are known. For example, there is known a method involving: obtaining a polyamide through polycondensation of a dicarboxylic acid component and a diamine component; and then increasing the degree of polymerization of the polyamide by a solid-phase polymerization method using a heating and drying apparatus, such as a tumble drier. However, the solid-phase polymerization method is limitative in producing a resin having a high melting point or in increasing the molecular weight of a resin having low crystallinity, and is therefore problematic, for example, in that the method cannot provide a resin having a high melting point.

Meanwhile, there is also known a method of obtaining a polyamide resin by melt-kneading a polyamide oligomer which has been obtained through polycondensation of a dicarboxylic acid component and a diamine component using a twin screw extruder for further polycondensation of the polyamide oligomer (for example, see PTL 1). The advantages of the twin screw extruder are that an oligomer can be melt-kneaded therein within a short period of time, a polyamide resin having a high melting point can be produced, and many kinds of products in small amounts can be processed by virtue of its self-cleaning performance. Accordingly, investigations have been made on various methods of producing various types of polyamide resins using the twin screw extruder.

CITATION LIST

Patent Literature

PTL 1: JP 2012-188557 A

SUMMARY OF INVENTION

However, the polymerization of the polyamide oligomer is dehydrating polycondensation and therefore generates a large amount of water in a reaction process thereof. Consequently, depending on the molecular weight of the oligomer and the water content thereof, a large amount of water generated during the process may flow backward when the polymerization reaction is carried out in an ordinary kneading operation using a twin screw extruder.

In addition, in the extruder, an open vent for removing water and a vacuum vent are arranged, and the polyamide oligomer is conveyed toward the downstream side while water is released to the outside via the vents. In this connection, there may occur a trouble in that the vacuum vent for securing the pressure inside the cylinder to be a negative pressure may be clogged by the raw material sucked together with water. Further, the open vent may cause incorporation of air into the cylinder depending on operation conditions or the like. Oxygen in the air incorporated into the cylinder may color a polyamide resin to be obtained or may deteriorate thermal stability.

In addition, in general, in production of a polyamide resin, a part of the region inside the cylinder is controlled to be a negative pressure with the vacuum vent, thereby providing a vacuum area. However, depending on reaction and extrusion conditions, inside the cylinder, the resin located upstream of the vacuum area cannot sufficiently deliver a polyamide resin in the vacuum area toward the downstream side to cause so-called surging, whereby the melted resin may not be extruded stably and continuously.

The present invention has been made in consideration of the above-mentioned problems, and a first object of the present invention is to provide a polyamide production method capable of producing a polyamide resin having a suitable molecular weight, a low yellow index, and excellent thermal stability by polymerizing a polyamide oligomer without causing any process trouble in the case of using a twin screw extruder.

A second object of the present invention is to provide a polyamide resin production method capable of extruding a polyamide resin stably and continuously while preventing occurrence of surging in the case of using a twin screw extruder.

The inventors of the present invention have made assiduous investigations to achieve the above-mentioned first object, and as a result, have focused on: a vacuum area in a cylinder formed by suction through a vacuum vent; and an open vent. The inventors have found that, when the molecular weight and the water content of the oligomer fall within a specific range, a polyamide resin having a low yellow index and excellent thermal stability can be produced without causing any process trouble by setting the length of the vacuum area to fall within a predetermined range, bringing the open vent positioned upstream of the vacuum area into a pressurized state, and arranging another open vent near a supply port, and have completed a first aspect of the present invention as described below. Specifically, the present invention provides the first aspect including the following items (1) to (9).

The inventors of the present invention have made assiduous investigations to achieve the above-mentioned second object, and as a result, have found that surging can be prevented by controlling a difference in relative viscosity between the relative viscosity on the upstream side and the relative viscosity on the downstream side of the vacuum area to a predetermined value or less, and have completed a second aspect of the present invention as described below. Specifically, the present invention provides the second aspect including the following items (10) to (22).

(1) A polyamide resin production method for producing a polyamide resin through polycondensation of a polyamide oligomer using an extruder including an intermeshed co-rotation twin screw within a cylinder, the polyamide oligomer comprising: a diamine unit comprising 70 mol % or more of a diamine unit selected from an aromatic diamine unit represented by the following general formula (I-1) and an alicyclic diamine unit represented by the following general formula (I-2); and a dicarboxylic acid unit comprising 50 mol % or more of a dicarboxylic acid unit selected from a linear aliphatic dicarboxylic acid unit represented by the following general formula (II-1) and an aromatic dicarboxylic acid unit represented by the following general formula (II-2), the production method comprising supplying the polyamide oligomer having a relative viscosity of from 1.1 to 1.3 and a water content of 3% by mass or less from a supply port into the cylinder and melt-kneading the polyamide oligomer in the cylinder to produce the polyamide resin through polycondensation, the extruder comprising an open vent (1), an open vent (2), and a vacuum vent, the open vent (1) being arranged at at least one of a position above the supply port or a position on an upstream end side with respect to a position of the supply port in the cylinder, the extruder further comprising a pressure-decreasing element arranged on an upstream side with respect to a position of the vacuum vent, the open vent (2) being arranged on a side downstream with respect to the position of the supply port in the cylinder and upstream with respect to a position of the pressure-decreasing element, the open vent (2) being brought into a pressurized state, an area of 50% or less of a total screw length of the extruder comprising a vacuum area at 300 torr or less:

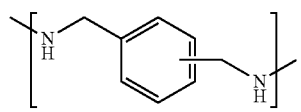
(I-1)

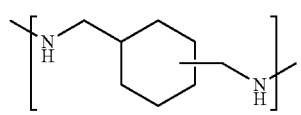
(I-2)

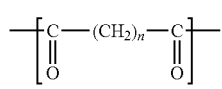
(II-1)

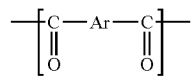
(II-2)

wherein, in the general formula (II-1), n represents an integer of from 2 to 18, and in the general formula (II-2), Ar represents an arylene group.

(2) The polyamide resin production method according to the above-mentioned item (1), wherein the extruder comprises only one open vent (2).

(3) The polyamide resin production method according to the above-mentioned item (1) or (2), wherein a relative viscosity of the polyamide resin is from 1.8 to 4.0.

(4) The polyamide resin production method according to any one of the above-mentioned items (1) to (3), wherein the polyamide oligomer has blended therein a phosphorus compound at a phosphorus atom concentration of from 10 ppm to 500 ppm.

(5) The polyamide resin production method according to any one of the above-mentioned items (1) to (4), wherein a kneading section for kneading the polyamide oligomer is arranged both in the vacuum area and at a position on an upstream side with respect to the vacuum area.

(6) The polyamide resin production method according to any one of the above-mentioned items (1) to (5), wherein at least one vacuum vent is arranged in an area of 25% or less of the total screw length from an end on a die side of the extruder.

(7) The polyamide resin production method according to any one of the above-mentioned items (1) to (6), wherein a kneading section comprising a kneading element having strong distributive mixing performance is arranged in an area of 25% or less of the total screw length from an end on a die side of the extruder.

(8) The polyamide resin production method according to any one of the above-mentioned items (1) to (7), wherein a kneading section for kneading the polyamide oligomer is arranged at a position on an upstream side with respect to the vacuum area and the kneading section comprises a kneading element having strong dispersive mixing performance.

(9) An article, which is formed from a polyamide resin produced by the polyamide resin production method of any one of the above-mentioned items (1) to (8), and which is selected from the group consisting of a packaging material, a packaging container, an industrial material, and an industrial component.

(10) A polyamide resin production method for producing a polyamide resin through polycondensation of a polyamide oligomer using an extruder including an intermeshed co-rotation twin screw within a cylinder, the polyamide oligomer comprising: a diamine unit comprising 70 mol % or more of a diamine unit selected from an aromatic diamine unit represented by the following general formula (I-1) and an alicyclic diamine unit represented by the following general formula (I-2); and a dicarboxylic acid unit comprising 50 mol % or more of a dicarboxylic acid unit selected from a linear aliphatic dicarboxylic acid unit represented by the following general formula (II-1) and an aromatic dicarboxylic acid unit represented by the following general formula (II-2), the production method comprising supplying the polyamide oligomer having a water content of 3% by mass or less from a supply port into the cylinder and melt-kneading the polyamide oligomer in the cylinder to produce the polyamide resin through polycondensation, the extruder comprising, in the cylinder, a vacuum vent, a pressure-decreasing element arranged on an upstream side with respect to a position of the vacuum vent, and an open vent (1A) arranged on a side downstream with respect to the supply port and upstream with respect to the pressure-decreasing element, an area of 50% or less of a total screw length of the extruder comprising a vacuum area at 300 torr or less, a difference between a relative viscosity of a polyamide resin located below the open vent (1A) and a relative viscosity of a polyamide resin extruded from the extruder being 0.9 or less:

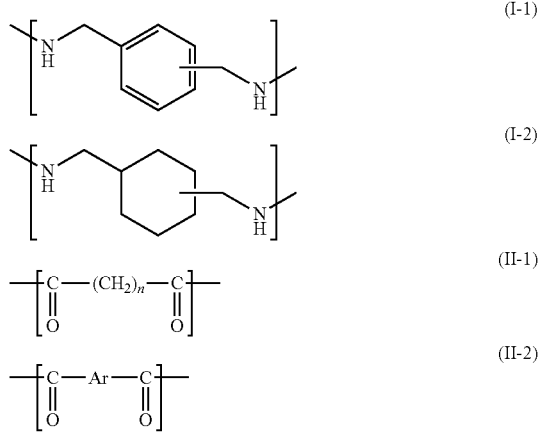

wherein, in the general formula (II-1), n represents an integer of from 2 to 18, and in the general formula (II-2), Ar represents an arylene group.

(11) The polyamide resin production method according to the above-mentioned item (10), wherein the relative viscosity of the polyamide resin located below the open vent (1A) is 1.6 or more.

(12) The polyamide resin production method according to the above-mentioned item (10) or (11), wherein the extruder further comprises a preceding open vent at at least one of a position above the supply port or a position on an upstream end side with respect to the open vent (1A) in the cylinder.

(13) The polyamide resin production method according to any one of the above-mentioned items (10) to (12), wherein a relative viscosity of the polyamide oligomer is from 1.1 to 1.3.

(14) The polyamide resin production method according to any one of the above-mentioned items (10) to (13), wherein the open vent (1A) is in a pressurized state.

(15) The polyamide resin production method according to any one of the above-mentioned items (10) to (14), wherein a relative viscosity of the polyamide resin is from 1.8 to 4.0.

(16) The polyamide resin production method according to any one of the above-mentioned items (10) to (15), wherein a molecular weight distribution (Mw/Mn) of the polyamide resin is from 1.8 to 2.5.

(17) The polyamide resin production method according to any one of the above-mentioned items (10) to (16), wherein the polyamide oligomer has blended therein a phosphorus compound at a phosphorus atom concentration of from 10 ppm to 500 ppm.

(18) The polyamide resin production method according to any one of the above-mentioned items (10) to (17), wherein a kneading section for kneading the polyamide oligomer is arranged both in the vacuum area and at a position on an upstream side with respect to the vacuum area.

(19) The polyamide resin production method according to any one of the above-mentioned items (10) to (18), wherein at least one vacuum vent is arranged in an area of 25% or less of the total screw length from an end on a die side of the extruder.

(20) The polyamide resin production method according to any one of the above-mentioned items (10) to (19), wherein a kneading section comprising a kneading element having strong distributive mixing performance is arranged in an area of 25% or less of the total screw length from an end on a die side of the extruder.

(21) The polyamide resin production method according to any one of the above-mentioned items (10) to (20), wherein a kneading section for kneading the polyamide resin is arranged at a position on an upstream side with respect to the vacuum area and the kneading section comprises a kneading element having strong dispersive mixing performance.

(22) An article, which is formed from a polyamide resin produced according to the polyamide resin production method of any one of the above-mentioned items (10) to (21), and which is selected from the group consisting of a packaging material, a packaging container, an industrial material, and an industrial component.

According to the first aspect of the present invention, a polyamide resin having a low yellow index and excellent thermal stability can be produced from a polyamide oligomer having a predetermined molecular weight and a predetermined water content, without causing any process trouble.

In addition, according to the second aspect of the present invention, a polyamide resin having excellent physical properties can be extruded stably and continuously, without causing surging or the like in a polyamide resin production method using an intermeshed co-rotation twin screw.

DESCRIPTION OF EMBODIMENTS

Figure 1:
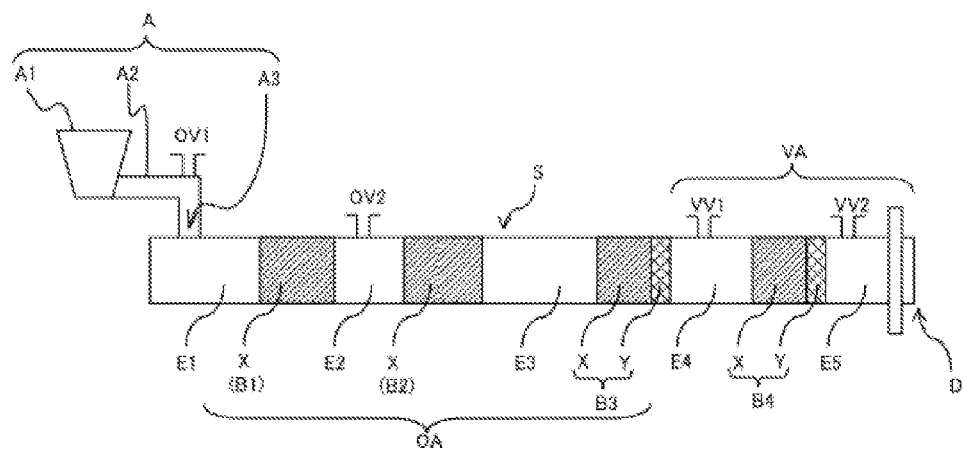
FIG. 1 is a schematic view for illustrating one example of an extruder to be used in a first embodiment of the present invention.

Now, the first and second aspects of the present invention are described as first and second embodiments.

First Embodiment

A polyamide resin production method according to a first embodiment comprises producing, through polycondensation of a polyamide oligomer, a polyamide resin having a molecular weight higher than that of the polyamide oligomer.

<Polyamide Oligomer>

The polyamide oligomer serving as a raw material in the present invention contains a diamine unit and a dicarboxylic acid unit.

It is preferred that the content of the diamine unit be substantially the same as that of the dicarboxylic acid unit from the viewpoint of a polymerization reaction. It is more preferred that the content of the dicarboxylic acid unit be 100±2 mol % of the content of the diamine unit. When the content of the dicarboxylic acid unit falls within the range of 100±2 mol % of the content of the diamine unit, the degree of polymerization of the polyamide resin is easy to increase, the polymerization is completed within a relatively short period of time, and the resin hardly undergoes thermal degradation.

The polyamide oligomer may contain any other constitutional unit than the diamine unit and the dicarboxylic acid unit in such a range that the effects of the present invention are not impaired.

[Diamine Unit]

The diamine unit in the polyamide oligomer contains a diamine unit selected from an aromatic diamine unit represented by the following general formula (I-1) and an alicyclic diamine unit represented by the following general formula (I-2), in an amount of 70 mol % or more in total in the diamine unit. The content is preferably 80 mol % or more, more preferably 90 mol % or more, and the upper limit thereof is 100 mol %.

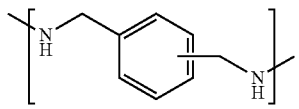

(I-1)

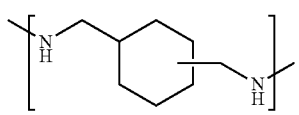

(I-2)

As compounds that can constitute the aromatic diamine unit represented by the general formula (I-1), there are given orthoxylylenediamine, metaxylylenediamine, and paraxylylenediamine. Those compounds may be used alone or in a combination of two or more kinds thereof.

As compounds that can constitute the alicyclic diamine unit represented by the general formula (I-2), there are given bis(aminomethyl)cyclohexanes, such as 1,3-bis(aminomethyl)cyclohexane, and 1,4-bis(aminomethyl)cyclohexane. Those compounds may be used alone or in a combination of two or more kinds thereof.

The bis(aminomethyl)cyclohexanes have structural isomers. In the case of 1,3-bis(aminomethyl)cyclohexane, when the cis-form ratio is increased, a polyamide resin having high crystallinity and satisfactory moldability is obtained. On the other hand, when the cis-form ratio is reduced, a transparent polyamide resin having low crystallinity is obtained. Accordingly, when the crystallinity of the polyamide resin is to be increased, the cis-form content ratio in the 1,3-bis(aminomethyl)cyclohexane is set to preferably 70 mol % or more, more preferably 80 mol % or more, even more preferably 90 mol % or more. On the other hand, when the crystallinity of the polyamide resin is to be reduced, the trans-form content ratio in the bis(aminomethyl)cyclohexanes is set to preferably 50 mol % or more, more preferably 60 mol % or more, most preferably 70 mol % or more.

In addition, in the case of 1,4-bis(aminomethyl)cyclohexane, when the trans-form ratio is increased, a polyamide resin having high crystallinity and satisfactory moldability is obtained. On the other hand, when the trans-form ratio is reduced, a transparent polyamide resin having low crystallinity is obtained. Accordingly, when the crystallinity of the polyamide resin is to be increased, the trans-form content ratio in 1,4-bis(aminomethyl)cyclohexane is set to preferably 70 mol % or more, more preferably 80 mol % or more, even more preferably 90 mol % or more. On the other hand, when the crystallinity of the polyamide resin is to be reduced, the cis-form content ratio in 1,4-bis(aminomethyl)cyclohexane is set to preferably 50 mol % or more, more preferably 60 mol % or more, most preferably 70 mol % or more.

In the present invention, the diamine unit in the polyamide oligomer contains at least one of the aromatic diamine unit represented by the general formula (I-1) or the alicyclic diamine unit represented by the general formula (I-2). Thus, the polyamide resin to be obtained can be given excellent gas-barrier performance, improved transparency and color tone, and satisfactory moldability. In addition, from the viewpoint of providing satisfactory oxygen absorption performance and satisfactory properties of the polyamide resin, it is preferred that the polyamide oligomer contain the aromatic diamine unit represented by the general formula (I-1).

From the viewpoints of allowing the polyamide resin to express excellent gas-barrier performance and easily realizing the moldability of general-purpose thermoplastic resins, the diamine unit in the polyamide oligomer preferably contains 50 mol % or more of a metaxylylenediamine unit. The content is preferably 70 mol % or more, more preferably 80 mol % or more, even more preferably 90 mol % or more, and the upper limit thereof is 100 mol %.

Compounds that can constitute any other diamine unit than the diamine unit represented by any one of the formulae (I-1) and (I-2), there may be given, for example, linear aliphatic diamines having 2 to 18 carbon atoms, preferably 2 to 12 carbon atoms, such as ethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine, and dodecamethylenediamine; aromatic diamines such as paraphenylenediamine; alicyclic diamines, such as 1,3-diaminocyclohexane and 1,4-diaminocyclohexane; other aliphatic diamines than linear aliphatic diamines, such as N-methylethylenediamine, 2-methyl-1,5-pentanediamine, and 1-amino-3-aminomethyl-3,5,5-trimethylcyclohexane; and polyether diamines each having an ether bond as typified by JEFFAMINE and ELASTAMINE (both trade names) manufactured by Huntsman Corporation, but the compounds are not limited thereto. Those compounds may be used alone or in a combination of two or more kinds thereof.

[Dicarboxylic Acid Unit]

The dicarboxylic acid unit in the polyamide oligomer contains a dicarboxylic acid unit selected from a linear aliphatic dicarboxylic acid unit represented by the following general formula (II-1) and an aromatic dicarboxylic acid unit represented by the following general formula (II-2), in an amount of 50 mol % or more in total in the dicarboxylic acid unit, from the viewpoints of the reactivity in polymerization and of the crystallinity and the moldability of the polyamide resin. The content is preferably 70 mol % or more, more preferably 80 mol % or more, even more preferably 90 mol % or more, and the upper limit thereof is 100 mol %.

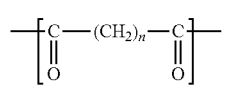

(II-1)

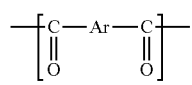

(II-2)

In the general formula (II-1), n represents an integer of from 2 to 18, and in the general formula (II-2), Ar represents an arylene group.

The linear aliphatic dicarboxylic acid unit represented by the general formula (II-1) is preferred because the polyamide resin to be obtained by the production method of the present invention can be given a suitable glass transition temperature and crystallinity and can be given flexibility necessary for, for example, packaging materials and packaging containers.

In the general formula (II-1), n represents an integer of from 2 to 18, preferably from 3 to 16, more preferably from 4 to 12, even more preferably from 4 to 8.

As compounds that can constitute the linear aliphatic dicarboxylic acid unit represented by the general formula (II-1), there may be given, for example, succinic acid, glutaric acid, adipic acid, pimelic acid, suberic acid, azelaic acid, sebacic acid, 1, 10-decanedicarboxylic acid, 1, 11-undecanedicarboxylic acid, and 1, 12-dodecanedicarboxylic acid, but the compounds are not limited thereto. Those compounds may be used alone or in a combination of two or more kinds thereof.

The kind of the linear aliphatic dicarboxylic acid unit represented by the general formula (II-1) is appropriately determined depending on the intended use thereof. The linear aliphatic dicarboxylic acid unit preferably contains at least one selected from the group consisting of an adipic acid unit, a sebacic acid unit, and a 1, 12-dodecanedicarboxylic acid unit in an amount of 50 mol % or more in total in the linear aliphatic dicarboxylic acid unit, from the viewpoints of imparting excellent gas-barrier performance to the polyamide resin and retaining the heat resistance of the packaging materials and the packaging containers after thermal sterilization. The content is more preferably 70 mol % or more, even more preferably 80 mol % or more, particularly preferably 90 mol % or more, and the upper limit thereof is 100 mol %.

From the viewpoints of the gas-barrier performance and the suitable thermal properties such as the glass transition temperature or the melting point of the polyamide resin, the linear aliphatic dicarboxylic acid unit in the polyamide oligomer preferably contains an adipic acid unit in an amount of 50 mol % or more in the linear aliphatic dicarboxylic acid unit. In addition, from the viewpoint of imparting suitable gas-barrier performance and molding process suitability to the polyamide resin, the linear aliphatic dicarboxylic acid unit in the polyamide oligomer preferably contains a sebacic acid unit in an amount of 50 mol % or more in the linear aliphatic dicarboxylic acid unit. In addition, when the polyamide resin is used for an application requiring low water absorbability, weatherability, and heat resistance, the linear aliphatic dicarboxylic acid unit preferably contains a 1, 12-dodecanedicarboxylic acid unit in an amount of 50 mol % or more.

The aromatic dicarboxylic acid unit represented by the general formula (II-2) is preferred because additional gas-barrier performance can be imparted to the polyamide resin and the molding processability can be improved in forming packaging materials and packaging containers.

In the general formula (II-2), Ar represents an arylene group. The arylene group is preferably an arylene group having 6 to 30 carbon atoms, more preferably 6 to 15 carbon atoms, and examples thereof include a phenylene group and a naphthylene group.

As compounds that can constitute the aromatic dicarboxylic acid unit represented by the general formula (II-2), there may be given, for example, terephthalic acid, isophthalic acid, and 2,6-naphthalenedicarboxylic acid, but the compounds are not limited thereto. Those compounds may be used alone or in a combination of two or more kinds thereof.

The kind of the aromatic dicarboxylic acid unit represented by the general formula (II-2) is appropriately determined depending on the intended use thereof. The aromatic dicarboxylic acid unit in the polyamide oligomer preferably contains at least one selected from the group consisting of an isophthalic acid unit, a terephthalic acid unit, and a 2,6-naphthalenedicarboxylic acid unit in an amount of 50 mol % or more in total in the aromatic dicarboxylic acid unit. The content is more preferably 70 mol % or more, even more preferably 80 mol % or more, particularly preferably 90 mol % or more, and the upper limit thereof is 100 mol %. In addition, among them, at least one of isophthalic acid or terephthalic acid is preferably contained in the aromatic dicarboxylic acid unit. The content ratio of the isophthalic acid unit to the terephthalic acid unit (isophthalic acid unit/terephthalic acid unit) is not particularly limited, and is appropriately determined depending on the intended use thereof. For example, from the viewpoints of a suitable glass transition temperature and a reduction in crystallinity, the molar ratio thereof is preferably from 0/100 to 100/0, more preferably from 0/100 to 60/40, even more preferably from 0/100 to 40/60, most preferably from 0/100 to 30/70, when the total of the two units in the ratio is defined as 100.

In the dicarboxylic acid unit of the polyamide oligomer, the content ratio of the above-mentioned linear aliphatic dicarboxylic acid unit to the aromatic dicarboxylic acid unit (linear aliphatic dicarboxylic acid unit/aromatic dicarboxylic acid unit) is not particularly limited, and is appropriately determined depending on the intended use thereof. For example, when the glass transition temperature of the polyamide resin is to be increased to reduce the crystallinity of the polyamide resin, the molar ratio "linear aliphatic dicarboxylic acid unit/aromatic dicarboxylic acid unit" is preferably from 0/100 to 60/40, more preferably from 0/100 to 40/60, even more preferably from 0/100 to 30/70, when the total of the two units in the ratio is defined as 100.

In addition, when the glass transition temperature of the polyamide resin is to be reduced to impart flexibility to the polyamide resin, the molar ratio "linear aliphatic dicarboxylic acid unit/aromatic dicarboxylic acid unit" is preferably from 40/60 to 100/0, more preferably from 60/40 to 100/0, even more preferably from 70/30 to 100/0, when the total of the two units in the ratio is defined as 100.

As compounds that can constitute any other dicarboxylic acid unit than the dicarboxylic acid unit represented by the general formula (II-1) or (II-2), there may be given, for example, dicarboxylic acids, such as oxalic acid, malonic acid, fumaric acid, maleic acid, 1,3-benzene-diacetic acid, and 1,4-benzene-diacetic acid, but the compounds are not limited thereto.

[Relative Viscosity and Water Content of Polyamide Oligomer]

A relative viscosity is known as an indicator of the molecular weight of the polyamide oligomer and that of the polyamide resin to be described below. In the first embodiment, the relative viscosity of the polyamide oligomer is from 1.1 to 1.3. In addition, in the first embodiment, the water content of the polyamide oligomer is 3% by mass or less. In the first embodiment, the relative viscosity and the water content each falling within the above-mentioned range, and hence the polyamide resin can be produced by further polymerizing the polyamide oligomer by the production method to be described below, without causing any process trouble.

For example, when the water content is more than 3% by mass or when the relative viscosity is less than 1.1, various troublesome problems occur in a polyamide resin production process. For example, a large amount of water may jet out through the open vents of the extruder, water vapor may flow back toward the supply section side, and the oligomer may solidify inside the cylinder and therefore cannot be extruded. A raw material oligomer to be subjected to the production method to be described below is produced in a polycondensation step, which is carried out as a preceding step of the production, and it is difficult to produce, in the preceding step, an oligomer so that the molecular weight thereof is more than 1.3, according to a simple method.

In this embodiment, the water content of the polyamide oligomer serving as the raw material is preferably 2.5% by mass or less, more preferably 1.8% by mass or less.

In addition, water vapor generated by heating and kneading of the polyamide oligomer is discharged from the open vents (1) and (2) as described below. When the polyamide oligomer has an increased water content, the amount of water vapor generated from the open vent (2) becomes larger, whereby the open vent (2) can easily be maintained in a pressurized state. In addition, when the polyamide oligomer has an increased water content, an improvement in process efficiency, such as a reduction in time for drying the oligomer, is easily achieved. From those viewpoints, the water content is preferably 0.5% by mass or more, more preferably 0.8% by mass or more.

[Yellow Index of Polyamide Oligomer]

The yellow index of the polyamide oligomer serving as the raw material in the present invention is preferably 10 or less, more preferably 7 or less. When the yellow index of the polyamide oligomer as the raw material is reduced, a polyamide resin having a satisfactory yellow index can be produced.

[Production Method for Polyamide Oligomer]

The polyamide oligomer in the present invention is obtained through a polycondensation reaction of a diamine component corresponding to the diamine unit of the polyamide resin and a dicarboxylic acid component corresponding to the dicarboxylic acid unit thereof.

The polycondensation reaction is carried out, for example, by a melt polycondensation method. Specifically, there is given a method involving carrying out a polycondensation reaction of a nylon salt formed of a dicarboxylic acid component and a diamine component by heating under pressure in the presence of water. In this case, the reaction may be carried out while condensation water is removed as required. In addition, the resultant polyamide oligomer can be finally separated from water through flushing or the like to obtain a powdery polyamide oligomer.

As the melt polycondensation method, there may also be given a method involving directly adding a diamine component to a molten dicarboxylic acid component for polycondensation. In this case, in order to keep the reaction system in a homogeneous liquid state, the diamine component is continuously added to the dicarboxylic acid component, and during the addition, the polycondensation is performed while the temperature of the reaction system is increased so that the reaction temperature does not become lower than the melting point of the polyamide oligomer to be produced. In addition, during dropwise addition of the diamine component, the reaction system may be pressurized.

In addition, after the polycondensation reaction, the polyamide oligomer may be appropriately subjected to drying or the like so as to adjust the water content to the one described above.

[Phosphorus Atom-Containing Compound and Alkali Metal Compound]

The polyamide oligomer serving as the raw material is preferably obtained through polycondensation of a dicarboxylic acid component and a diamine component in the presence of a phosphorus atom-containing compound. When the phosphorus atom-containing compound is blended before the production of the polyamide oligomer as just described, the polymerization efficiency in producing the polyamide oligomer and the polyamide resin can be made satisfactory and the polyamide oligomer and the polyamide resin can be prevented from being colored.

Examples of the phosphorus atom-containing compound include: phosphinic acid compounds, such as dimethylphosphinic acid and phenylmethylphosphinic acid; hypophosphorous acid compounds, such as hypophosphorous acid, sodium hypophosphite, potassium hypophosphite, lithium hypophosphite, magnesium hypophosphite, calcium hypophosphite, and ethyl hypophosphite; phosphonic acid compounds, such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, and potassium ethylphosphonate; phosphonous acid compounds, such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite, and ethyl phenylphosphonite; phosphorous acid compounds, such as phosphorous acid, sodium hydrogenphosphite, sodium phosphite, lithium phosphite, potassium phosphite, magnesium phosphite, calcium phosphite, triethyl phosphite, triphenyl phosphite, and pyrophosphorous acid.

Among them, metal hypophosphites, such as sodium hypophosphite, calcium hypophosphite, potassium hypophosphite, and lithium hypophosphite, are preferably used because of their high promoting effects on a polycondensation reaction and excellent coloration-preventing effects. In particular, sodium hypophosphite is preferred. It should be noted that the phosphorus atom-containing compounds that may be used in the present invention are not limited to the above-mentioned compounds.

The amount of the phosphorus atom-containing compound to be blended is preferably from 10 ppm to 500 ppm, more preferably from 20 ppm to 300 ppm, in terms of phosphorus atom concentration in the polyamide oligomer. When the amount is 10 ppm or more, the polycondensation reaction proceeds at a suitable rate and coloration hardly occurs during the polycondensation reaction. When the amount is 500 ppm or less, the polyamide oligomer and the polyamide resin hardly gel and incorporation of fish eyes that may be caused by the phosphorus atom-containing compound is suppressed in formed articles, resulting in satisfactory appearance of formed articles.

The polyamide oligomer serving as the raw material may also be obtained through polycondensation in the presence of an alkali metal compound in addition to the phosphorus atom-containing compound.

In order to prevent the polyamide resin and the polyamide oligomer from being colored, a sufficient amount of the phosphorus atom-containing compound is required to be present, but the presence of the phosphorus atom-containing compound causes gelation of the polyamide oligomer and the polyamide resin in some cases. Therefore, the blending of the alkali metal compound in addition to the phosphorus atom-containing compound can control an amidation reaction rate to prevent the gelation.

Preferred examples of the alkali metal compound include an alkali metal hydroxide, an alkali metal acetate, an alkali metal carbonate, and an alkali metal alkoxide. Specific examples of the alkali metal compound that may be used in the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide, and sodium carbonate, but any others not limited to those compounds may be used. It should be noted that the ratio (molar ratio) "phosphorus atom-containing compound/alkali metal compound" of the phosphorus atom-containing compound to the alkali metal compound in the polyamide oligomer falls within a range of preferably from 1.0/0.05 to 1.0/1.5, more preferably from 1.0/0.1 to 1.0/1.2, even more preferably from 1.0/0.2 to 1.0/1.1, from the viewpoints of controlling a polymerization rate and reducing a yellow index.

<Polyamide Resin>

The polyamide resin to be obtained by the production method of the present invention includes a diamine unit and a dicarboxylic acid that are same as those in the polyamide oligomer. In addition, the polyamide resin may also contain any other optional unit than the diamine unit and the dicarboxylic acid unit, as in the polyamide oligomer.

[Molecular Weight of Polyamide Resin]

According to the production method of the present invention to be described below, the polyamide resin can have a sufficiently increased molecular weight and can therefore have an increased relative viscosity. The relative viscosity of the polyamide resin obtained by the production method of the present invention is preferably from 1.8 to 4.0, more preferably from 2.0 to 3.5. When the relative viscosity is 1.8 or more, the polyamide resin obtained in the present invention can be utilized without causing a problem of moldability due to an insufficient melt viscosity during molding processing. On the other hand, when the relative viscosity is 4.0 or less, the polyamide resin obtained in the present invention can be utilized without causing a problem of moldability due to an excessively high melt viscosity during molding processing.

[Water Content of Polyamide Resin]

The polyamide resin obtained in the present invention has a low water content because the dehydration of the polyamide resin sufficiently proceeds as described below. Specifically, the water content is preferably 0.3% by mass or less, more preferably 0.1% by mass or less. In addition, the water content is, for example, 0.01% by mass or more in order to efficiently produce the polyamide resin. The water content as used herein refers to a value measured after cooling the polyamide resin to be obtained in air (by air-cooling).

[Yellow Index of Polyamide Resin]

The yellow index of the polyamide resin obtained in the present invention can be controlled to be a low value, due to low heat history by heating. Specifically, the yellow index is preferably 30 or less, more preferably 25 or less.

[Melting Point of Polyamide Resin]

In the present invention, even a polyamide resin having a high melting point or a polyamide resin having low crystallinity can be produced by the production method to be described below. The melting point of polyamide resin is, for example, 220° C. or more, but in the present invention, a polyamide resin having a melting point of 300° C. or more may also be produced. The melting point of the polyamide resin is generally 380° C. or less, preferably 360° C. or less. It should be noted that the melting point as used herein refers to, when the polyamide resin has two melting point peaks, the peak temperature on the high temperature side, unless otherwise stated.

The polyamide resin of the present invention may be formed, for example, into an article including: packaging containers for containing and storing therein various products such as various liquid drinks, various liquid foods, liquid medicines, and liquid daily necessities; packaging materials for packaging various products such as various foods, various medicines, various daily necessities, various electronic materials, gasoline, various agricultural chemicals, and various organic solvents; industrial materials such as fibers and CFRPs; and industrial components such as fuel tanks, fuel tubes, connectors, slide parts, radiator tanks, engine mounts, connector parts, and the like for automobiles and the like, backlight sources for liquid crystal displays, semiconductor substrate parts, housings for portable phones, personal computers, and the like, and metal-alternative parts.

<Production Method for Polyamide Resin>

In the first embodiment of the present invention, the above-mentioned polyamide oligomer is polycondensed to produce a polyamide resin, through use of an extruder. The extruder to be used in the present invention is an extruder including an intermeshed co-rotation twin screw within a cylinder and is used to produce a polyamide through polycondensation by supplying a polyamide oligomer from a supply port into the cylinder and melt-kneading the polyamide oligomer in the cylinder.

The extruder to be used in the first embodiment of the present invention includes an open vent (1), an open vent (2), and a vacuum vent. The open vent (1) is arranged at at least one of a position above the supply port or a position on the upstream end side with respect to the position of the supply port in the cylinder. It should be noted that the upstream end refers to an end on the opposite side to the end in which a die is arranged in the cylinder.

In addition, in the first embodiment of the present invention, the pressure-decreasing element is arranged on the upstream side with respect to the position of the vacuum vent. Further, the open vent (2) is arranged on the downstream side with respect to the supply port and the upstream side with respect to the position of the pressure-decreasing element in the cylinder, and the open vent (2) is in a pressurized state.

Further, when the extruder is controlled to a negative pressure by the vacuum vents on the downstream side with respect to the pressure-decreasing element, the area of 50% or less of the total screw length thereof becomes a vacuum area at 300 torr or less.

Figure 2:
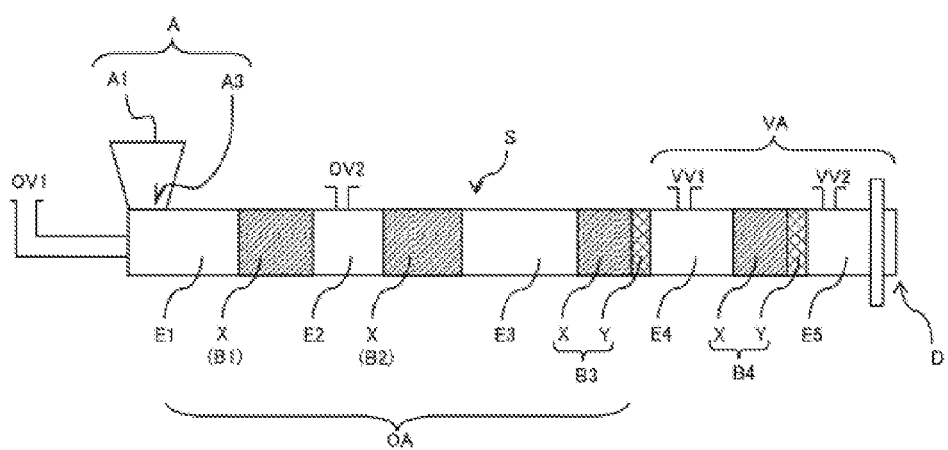
FIG. 2 is a schematic view for illustrating another example of the extruder to be used in the first embodiment of the present invention.

Now, the production method according to the first embodiment of the present invention is described in more detail with reference to FIG. 1 and FIG. 2. FIG. 1 is one example of an extruder to be used in the first embodiment. FIG. 2 is another example of the extruder to be used in the first embodiment. It should be noted that, in the drawings, members corresponding to each other have the same reference symbol.

As illustrated in FIG. 1, the extruder to be used in the first embodiment includes a supply section A, which is arranged at a position on the upstream side and includes a supply port A3, and a cylinder S, which includes an intermeshed co-rotation twin screw therein. The cylinder S includes a plurality of kneading sections B1 to B4 for kneading or mixing a resin therein, which are arranged on the downstream side with respect to the supply port A3, and a die D, which is arranged at a position on the most downstream side. The cylinder S further includes conveyance sections E1 to E5 for conveying the resin, between the supply port A3 and the kneading section B1, every between the kneading sections B1 to B4, and between the kneading section B4 and the die D. It should be noted that, in the example illustrated in FIG. 1, four kneading sections B1 to B4 are illustrated, but the number of kneading sections is not limited thereto and may be any number as long as the number is one or more.

However, on an upstream side with respect to a vacuum area VA to be described below, one or more kneading sections are preferably arranged, and two or more kneading sections are more preferably arranged. In addition, it is preferred that one or more kneading sections be arranged in the vacuum area VA as well.

In general, the extruder including an intermeshed co-rotation twin screw is an extruder including two screws that rotate in the same direction inside the cylinder and have an intermeshing ratio of from 1.2 to 1.7, and having self-cleaning performance.

In this embodiment, a polyamide oligomer serving as a raw material is supplied from the supply port A3 into the cylinder S, and is conveyed to the die D via the conveyance sections E1 to E5 and the kneading sections B1 to B4 while being heated. In this case, the polyamide oligomer is heated and melted in the conveyance sections E1 to E5 and the kneading sections B1 to B4, and kneaded in the kneading sections B1 to B4 for polycondensation, whereby the degree of polymerization thereof is increased, and the resultant polyamide resin is then extruded through the die D.

The strand-like resin extruded from the extruder is generally cooled. As a cooling method for the resin, there are given, for example, an air-cooling method and a water-cooling method involving cooling the resin in a water bath, but the method is not limited thereto. In the case of the water-cooling method, the resin can be cooled rapidly, but the method may require a drying step. In the case of the air-cooling method, the drying step can be omitted, but the method may require some distance for cooling.

In this embodiment, though not particularly limited, the polyamide oligomer serving as the raw material is charged into the supply section A in the form of a powder, a particle, or a pellet.

In order that the polyamide resin or oligomer can be melted, kneaded, and suitably extruded in the cylinder, the temperature at least in a part inside the extruder is controlled to be higher than the melting point of the polyamide resin to be produced, so that the temperature of the resin to be extruded through the die D is higher than the melting point of the polyamide resin to be produced.

The internal temperature of the cylinder may be set to a constant one over all areas, but the cylinder may have an area having a relatively low temperature and an area having a relatively high temperature. For example, the area on the most upstream side may be controlled to have a relatively low temperature and the other area may be controlled to have a relatively high temperature, because the softening temperature of the polyamide increases and the heat resistance thereof improves as the polymerization reaction proceeds. In addition, when the polyamide oligomer needs to be filled into the screw with rapidly softening on the upstream side, the temperature on the upstream side may be controlled to be relatively high, the temperature in the intermediate section may be controlled to be low, and the temperature on the downstream side may be controlled to be higher than that on the upstream side. Further, when the polyamide needs to be prevented from being degraded by heat as much as possible, the temperature on the downstream side may be reduced to a temperature near to the softening temperature of the polyamide not causing any trouble thereon, whereby the resin pressure may be stabilized and the drawability of the strand may be thereby stabilized.

As illustrated in FIG. 1, the supply section A includes, for example, a charge section A1 for charging an oligomer, such as a hopper, a feed section A2 for laterally feeding the oligomer charged from the charge section A1, and a supply port A3 for supplying the oligomer into the cylinder, which is a part for connection to the cylinder. The supply section A includes the feed section A2 and hence can supply the oligomer into the cylinder while controlling the amount of the oligomer charged to the charge section A1. In addition, in the supply section A illustrated in FIG. 1, an open vent OV1 (open vent (1)) is arranged at a position above the supply port A3.

The supply section A is preferably a twin-screw-type powder feeder, and in such case, a twin screw is arranged inside the feed section A2. Specific examples of the twin-screw-type powder feeder include a twin-screw-type cassette weighing feeder manufactured by Kubota Corporation and a twin-screw-type feeder manufactured by K-Toron.

It should be noted that, as illustrated in FIG. 2, the feed section A2 may be omitted in the supply section A. In this case, for example, the charge section A1 is arranged above the supply port A3, and the open vent OV1 (open vent (1)) includes a so-called rear vent or the like. Specifically, the open vent OV1 is connected to a position on the upstream end side with respect to the position of the supply port A3 in the cylinder.

It should be noted that, even when the supply section A includes a feed section A2, the open vent OV1 may include a so-called rear vent or the like and may be connected to a position on the upstream end side with respect to the position of the supply port A3 in the cylinder.

As described above, in the first embodiment of the present invention, the open vent OV1 is arranged at a position near the supply port A3, and hence water vapor generated near the supply port A3 in the cylinder can be rapidly discharged to the outside of the cylinder so that the reaction can proceed early.

In addition, when a polyamide oligomer having a water content of, for example, 0.8% by mass or more is used as the oligomer to be charged to the extruder, the amount of water vapor generated by heating and kneading the oligomer in the cylinder increases. Accordingly, when the open vent OV1 is absent near the supply port A3, water vapor may be insufficiently discharged from an open vent OV2 to be described below to allow the water vapor to flow backward to the supply section A. In addition, when water vapor flows backward and is discharged from the supply port A3, the oligomer to be supplied into the cylinder may wet. When the oligomer wets in the supply section A, the oligomer particles are attached to each other to form an aggregate, which makes it difficult to control the amount of the oligomer to be supplied into the cylinder and causes failure of feeding, such as lowered meltability of the oligomer supplied into the cylinder.

In the first embodiment of the present invention, the open vent OV1 arranged near the supply port A3 can prevent vent-up and failure of feeding due to water vapor in the supply section A as described above, whereby the polycondensation reaction can proceed stably.

The sites in the screw corresponding to the kneading sections B1 and B2 each include a kneading element X. In addition, the sites corresponding to the kneading sections B3 and B4 each include a kneading element X and a pressure-decreasing element Y positioned downstream of the kneading element X. The kneading element X is appropriately selected from a kneading disc, a rotor, a mixing element, a mixing gear, and the like, as described below. It should be noted that, as the kneading element X, two or more of those elements may be combined to form one kneading element X.

The pressure-decreasing element Y has a pressure-decreasing ability, and increases the filling ratio of the resin or oligomer at the kneading element X in each of the kneading sections B3 and B4. The pressure-decreasing element Y includes a full-flight reverse screw, a sealing disc, or the like. In each of the kneading sections, the pressure-decreasing element Y increases the filling ratio of the resin or oligomer in the section corresponding to the kneading element X, and accordingly, the kneading element X can suitably mix and disperse the resin or the oligomer. Further, the pressure-decreasing element Y allows the melted resin to flow backward with a full-flight screw or blocks the flow of the melted resin with a sealing disc or the like. Accordingly, as described below, the pressure-decreasing element Y can control the area on the downstream side with respect to the pressure-decreasing element Y to have a negative pressure to provide the vacuum area, together with the vacuum vent positioned downstream of the pressure-decreasing element Y. In addition, as described below, the pressure-decreasing element Y in the kneading section B3 seals a vacuum area VA and a preceding area OA to each other.

In addition, the sites in the screw corresponding to the conveyance sections E1 to E5 each include, for example, a feed screw, such as a full-flight screw element. The screw form may be a single-thread screw, a double-thread screw, or a triple-thread screw, but a double-thread screw is most widely used.

The extruder includes an open vent OV2 (open vent (2)) and vacuum vents VV1 and VV2 in the cylinder in addition to the open vent OV1 (open vent (1)). In the cylinder, the open vent OV2 is arranged on the upstream side, and the vacuum vents VV1 and VV2 are arranged on the downstream side (die D side).

The vacuum vents VV1 and VV2 are each configured to control the pressure inside the extruder to a negative one by suction with a vacuum pump or the like. More specifically, the vacuum vent VV1 is arranged in the conveyance section E4 between the kneading sections B3 and B4, and the vacuum vent VV2 is arranged in the conveyance section E5 between the kneading section B4 and the die D. With this, in the extruder, the area on the downstream side with respect to the pressure-decreasing element Y in the kneading section B3, that is, the area ranging from the conveyance section E4 to the end on the die D side serves as the vacuum area VA by the action of the vacuum vents VV1 and VV2.

It should be noted that the number of the vacuum vents and the positions at which the vacuum vents are arranged in FIG. 1 and FIG. 2 are merely illustrative, and the number and the positions are not limited thereto. Any number of the vacuum vents may be arranged at any positions as long as the vacuum area VA that has a predetermined length and a predetermined vacuum degree can be formed.

However, in order to secure the vacuum degree in the area on the downstream side and to increase the molecular weight of the polyamide resin or oligomer, it is preferred that at least one vacuum vent be arranged in the area of 25% or less of the total screw length from the end on the die D side of the extruder.

In addition, the open vent OV2 is arranged in the area (referred to as preceding area OA) on the downstream side with respect to the supply port A3 and the upstream side with respect to the pressure-decreasing element Y (namely, vacuum area VA) in the kneading section B3.

The polyamide oligomer in this embodiment has a low molecular weight, and in the upstream section of the cylinder, the reaction of the polyamide oligomer relatively rapidly proceeds to generate a large amount of water. The large amount of water generated is discharged through the open vent OV1 arranged near the supply port A3 and the open vent OV2 arranged in the upstream section of the cylinder. Accordingly, the dehydration in the cylinder suitably proceeds, and the polycondensation reaction is prevented from being inhibited by the presence of water.

In addition, in the downstream section of the extruder, the resin or the oligomer has a reduced water content and an increased molecular weight. In this case, the downstream section of the extruder is the vacuum area VA, and hence the water content is suitably reduced under the negative pressure therein and thus the reaction proceeds.

In this embodiment, the open vent OV2 is in a pressurized state. The phrase "the open vent OV2 is in a pressurized state" refers to a state in which the pressure inside the cylinder is relatively high, the pressure outside the cylinder is relatively low, and water vapor is discharged from the open vent OV2. The discharge of the water vapor from the open vent OV2 can be confirmed by visually observing the water vapor. In addition, when a flow rate measured at a height of 1 m above the vent port using an anemometer (Anemomaster LITE Model 6006 manufactured by Kanomax) is 0.1 m/s or more, the open vent OV2 can be determined objectively to be in a pressurized state. In addition, in the open vent OV2, in order to efficiently prevent air from the outside from entering the cylinder, the flow rate is preferably 0.3 m/s or more. In addition, the upper limit of the flow rate is not particularly limited, but is preferably 5 m/s or less in order to prevent the melted resin in the cylinder from being taken in the vent to cause vent-up.

In addition, the open vent OV2 may be any of a short vent and a long vent. For example, when the flow rate may become too high, a long vent may be used. The long vent refers to, for example, when the cylinder includes a plurality of barrels, a vent having a length corresponding to a total length of two barrels.

Meanwhile, the open vent OV1 arranged near the supply port is preferably in a pressurized state, but may be, for example, a normal-pressure state without being in the pressurized state.

In the first embodiment of the present invention, when the open vent OV2 is not in a pressurized state, water in the cylinder cannot be discharged completely. In addition, air is taken in from the outside via the open vent OV2 toward the vacuum vent VV1 side, whereby the air (oxygen) causes an increase in the yellow index of the resin and a variation in the molar ratio inhibits an increase in the molecular weight of the polyamide resin to be obtained. Further, it becomes difficult to secure the vacuum degree in the vacuum area VA.

It should be noted that two or more open vents (2) may be arranged in the preceding area OA, and all of the open vents (2) arranged in the preceding area OA are in a pressurized state. When the preceding area OA includes the open vent (2) that is not in the pressurized state, i.e., in a normal-pressure state or in a negative-pressure state, air is taken in from the open vent (2) in a normal-pressure state or in a negative-pressure state into the cylinder, resulting in oxidative deterioration of the melted resin. From the viewpoint of keeping the open vent in the preceding area OA in a highly pressurized state, the preceding area OA preferably includes only one open vent (2).

In addition, in the first embodiment of the present invention, in order to completely discharge water in the oligomer and water generated through the polycondensation reaction from the cylinder, it is necessary to completely seal the inside of the cylinder in front of the vacuum vent VV1 so that the open vent OV2 is always in a pressurized state.

In this embodiment, when the resin is sufficiently kneaded and allowed to react in the preceding area OA while removing water in the open vents OV1 and OV2, the viscosity of the melted resin can be increased sufficiently, whereby the sealing property in the pressure-decreasing element Y of the kneading section B3 can be enhanced sufficiently. This is because a melted resin having a high viscosity is hard to flow through a space between the inner wall of the cylinder and the pressure-decreasing element Y, and hence sufficiently seal the inside of the cylinder.

In addition, it is preferred that the polyamide oligomer be completely melted before reaching at least the position of the open vent OV2.

As described above, when the polyamide oligomer is melted before reaching the position of the open vent OV2, the open vent OV2 is not clogged by the powdery oligomer and water can be actively discharged through the open vent OV2.

In addition, as illustrated in FIG. 1 and FIG. 2, the open vent OV2 is preferably arranged between the kneading sections B1 and B2. The oligomer is sufficiently melted when passing through the kneading section B1, and hence the open vent OV2 positioned downstream of the kneading section B1 can prevent the powdery oligomer from causing clogging of the open vent port. In addition, when the open vent OV2 is arranged on the upstream side with respect to the kneading section B2, the open vent OV2 can be easily kept in a pressurized state, whereby the reaction can proceed suitably through kneading in the kneading section B2.

Further, it is preferred that no open vent be arranged in the conveyance section E3 adjacent to the kneading section B3. This is because when the open vent is arranged in the conveyance section E3, the open vent is hardly kept in a pressurized state and air is liable to be taken in from the open vent toward the vacuum vent VV1 side.

In addition, when the total distance from the most upstream side of the vacuum area VA to the upstream end in the cylinder is defined as 100%, the open vent OV2 (open vent (2)) is arranged at the position upstream preferably by 30% or more, more preferably 50% or more from the most upstream side of the vacuum area VA. As described above, when the open vent OV2 is arranged at a distant position from the vacuum area VA, intake of air from the open vent OV2 to the vacuum area VA side can be prevented.

It should be noted that the position of the open vent OV2 arranged is not particularly limited as long as the open vent OV2 is arranged in the preceding area OA.

In this embodiment, the vacuum area VA is an area of 50% or less of the total screw length. When the vacuum area VA is an area of more than 50%, the oligomer or the resin may be conveyed to the vacuum area VA in an unmelted or undehydrated state to cause clogging or the like of the vacuum vent. In addition, from such viewpoint, the length of the vacuum area VA is more preferably 40% or less of the total screw length.

The length of the vacuum area VA is preferably 10% or more of the total screw length. When the length of the vacuum area VA is 10% or more, dehydration can be sufficiently performed and the water content of the polyamide resin to be obtained can be thereby reduced. In addition, the polycondensation reaction can proceed sufficiently and the molecular weight of the polyamide resin to be obtained can be thereby sufficiently increased. From such viewpoints, the length of the vacuum area VA is preferably 15% or more, more preferably 20% or more.

In this embodiment, the vacuum degree in the vacuum area VA is kept at 300 torr or less. When the vacuum degree in the vacuum area VA is more than 300 torr, the oligomer cannot be sufficiently dehydrated and the water content of the polyamide resin to be obtained cannot be sufficiently reduced. In addition, the polycondensation reaction for producing the polyamide resin cannot proceed suitably, and the molecular weight of the polyamide resin may not be sufficiently increased. In addition, the yellow index (YD of the polyamide resin may be increased.

The vacuum degree in the vacuum area VA is preferably 200 torr or less, more preferably 180 torr or less. When the vacuum degree is such upper limit or less, the water content of the polyamide resin can be further reduced and the polycondensation reaction can proceed more easily.

It should be noted that the lower limit of the vacuum degree is not particularly limited, but the vacuum degree may be generally 1 torr or more in view of the characteristics of an apparatus and the like.

It should be noted that, in this embodiment, the preceding area OA on the upstream side with respect to the vacuum area VA in the extruder is preferably a normal-pressure area that is not substantially under a negative pressure or an area having a slightly higher pressure than normal pressure. It should be noted that, in this area, in general, an inert gas, such as nitrogen, is introduced from the supply section A.

It should be noted that the vacuum degree is measured at each vacuum vent. For example, in the examples of FIG. 1 and FIG. 2, the vacuum vent VV1 is configured to control the supply section E4 and the kneading section B4 to be a negative pressure, and the vacuum degree measured at the vacuum vent VV1 is determined to be the vacuum degree in the supply section E4 and the kneading section B4. Similarly, the vacuum vent VV2 is configured to control the supply section E5 and the inside of the die D to be a negative pressure, and the vacuum degree measured at the vacuum vent VV2 is determined to be the vacuum degree in the supply section E5 and the inside of the die D.

The polyamide resin production method according to the first embodiment described above allows a polyamide resin having a low yellow index and excellent thermal stability to be produced from a polyamide oligomer having a predetermined molecular weight and a predetermined water content, without causing any process trouble.

Second Embodiment

Next, a polyamide resin production method according to a second embodiment is described.

The polyamide resin production method according to the second embodiment is a polyamide production method for producing, through polycondensation of a polyamide oligomer, a polyamide resin having a molecular weight higher than that of the polyamide oligomer.

Now, the second embodiment is described in more detail.
<Polyamide Oligomer>

The polyamide oligomer serving as the raw material in the second embodiment has a water content of 3% by mass or less. In the second embodiment, the water content falls within the above-mentioned range, and hence the polyamide resin can be produced by further polymerizing the polyamide oligomer by the production method to be described below, without causing any process trouble.

On the other hand, when the water content is more than 3% by mass, various troublesome problems occur in a polyamide resin production process. For example, a large amount of water may jet out through the open vents of the extruder, water vapor may flow back toward the supply section side, and the oligomer may solidify inside the cylinder and therefore cannot be extruded.

In the second embodiment, the water content of the polyamide oligomer serving as the raw material is preferably 2.5% by mass or less, more preferably 2.0% by mass or less.

Also in the second embodiment, as described above, water vapor generated by heating and kneading of the polyamide oligomer is discharged from the open vent (1A) arranged on the side downstream with respect to the position of the supply port and upstream with respect to the pressure-decreasing element in the cylinder. When the polyamide oligomer has a high water content, the amount of water vapor generated from the open vent (1A) increases, which makes it easy to keep the open vent (1A) in a pressurized state. In addition, when the polyamide oligomer has an increased water content, an improvement in process efficiency, such as a reduction in time for drying the oligomer, can be easily achieved. From those viewpoints, the water content is preferably 0.5% by mass or more, more preferably 1.0% by mass or more.

In the second embodiment, the relative viscosity of the polyamide oligomer serving as the raw material is not particularly limited and is preferably from 1.1 to 1.3, as in the first embodiment. When the relative viscosity is 1.1 or more, the polycondensation reaction can be prevented from proceeding abruptly in the preceding section of the cylinder, whereby generation of a large amount of water in the upstream section of the cylinder can be prevented. In addition, when the relative viscosity is controlled to 1.3 or less, the oligomer serving as the raw material can be produced by a simple method.

The polyamide oligomer to be used as the raw material in the second embodiment is the same in other respects as the polyamide oligomer to be used as the raw material in the first embodiment, and hence the description thereof is omitted.
<Polyamide Resin>

In addition, the polyamide resin obtained by the following production method according to the second embodiment is the same as the polyamide resin obtained by the production method according to the first embodiment, and hence the description thereof is also omitted.

A molecular weight distribution (Mw/Mn) is known as an indicator of the dispersity of the polyamide resin. The polyamide resin to be obtained in the second embodiment has a relatively low dispersity. Specifically, Mw/Mn of the polyamide resin is preferably from 1.8 to 2.5, more preferably from 1.8 to 2.3. When the molecular weight distribution is 1.8 or more, there is no particular problem in moldability. When the molecular weight distribution is 2.5 or less, the amount of the low-molecular weight components and the like is small, and hence the resin can have excellent heat resistance and impact resistance with less change in color in molding the resin at high temperature and in processing the molded articles at high temperature.
<Production Method for Polyamide Resin>

Next, the polyamide resin production method in the second embodiment is described.

Also in the second embodiment, a polyamide resin is obtained through polycondensation of the polyamide oligomer using an extruder, as in the first embodiment. The extruder to be used in the second embodiment of the present invention is an extruder including an intermeshed co-rotation twin screw within a cylinder and is used to produce a polyamide resin through polycondensation by supplying a polyamide oligomer from a supply port into the cylinder and melt-kneading the polyamide oligomer in the cylinder.

The extruder to be used in the second embodiment of the present invention includes an open vent (1A) and vacuum vents, a pressure-decreasing element arranged on the upstream side with respect to the position of each of the vacuum vents in which the open vent (1A) is arranged on the side downstream with respect to the supply port and upstream with respect to the position of the pressure-decreasing element in the cylinder.

Further, when the extruder is controlled to a negative pressure by the vacuum vents on the downstream side with respect to the pressure-decreasing element, the area of 50% or less of the total screw length thereof becomes a vacuum area at 300 torr or less.

In addition, in the second embodiment of the present invention, a polyamide resin is produced using such extruder so that a difference in relative viscosity between the relative viscosity η1 of the polyamide resin located below the open vent (1A) and the relative viscosity η2 of the polyamide resin extruded from the extruder (namely, polyamide resin to be obtained by the production method of the present invention) is controlled to 0.9 or less. It should be noted that, in the second embodiment of the present invention, the relative viscosity $\eta 2$ is larger than the relative viscosity $\eta 1$, and hence the difference in relative viscosity is represented as "$(\eta 2 - \eta 1)$".

Figure 3:
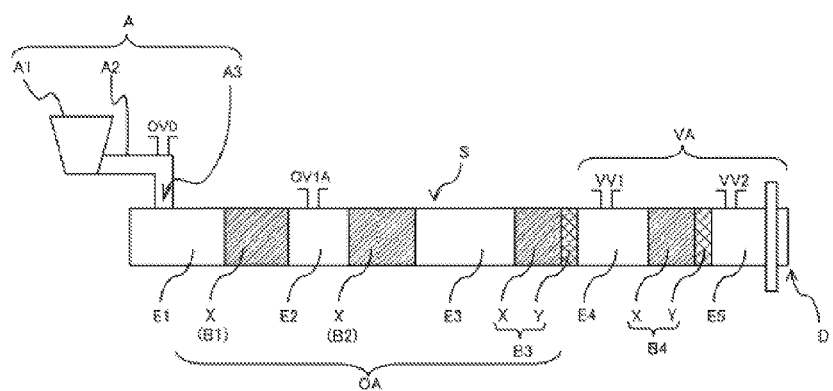
FIG. 3 is a schematic view for illustrating one example of an extruder to be used in a second embodiment of the present invention.
Figure 4:
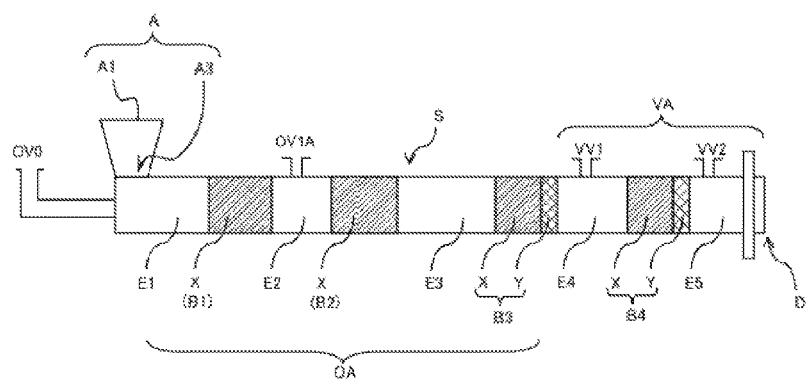
FIG. 4 is a schematic view for illustrating another example of the extruder to be used in the second embodiment of the present invention.
Figure 5:
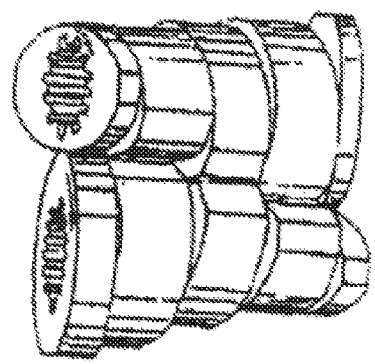
FIG. 5 is a perspective view for illustrating a kneading disc to be used in the present invention.

Now, the production method according to the second embodiment is described in more detail with reference to FIG. 3 and FIG. 4. FIG. 3 and FIG. 4 are views for illustrating examples of an extruder to be used in the second embodiment.

The extruder to be used in the second embodiment includes a supply section A, which is arranged at a position on the upstream side in the cylinder and includes a supply port A3, and a cylinder S, which includes an intermeshed co-rotation twin screw therein. The cylinder S is arranged on the downstream side with respect to the supply port A3 and includes a plurality of kneading sections B1 to B4 for kneading or mixing a resin and a die D arranged at a position on the most downstream side. In addition, the cylinder S further includes conveyance sections E1 to E5 for conveying the resin between the supply port A3 and the kneading section B1, every between the kneading sections B1 to B4, and between the kneading section B4 and the die D. It should be noted that, four kneading sections B1 to B4 are illustrated in the examples of FIG. 1 and FIG. 2. However, the number of the kneading sections is not limited thereto and may be any number as long as the number is one or more.

However, the extruder includes preferably one or more kneading sections, more preferably two or more kneading sections on the upstream side with respect to a vacuum area VA to be described below. In addition, the vacuum area VA preferably includes one or more kneading sections.

In general, the extruder including an intermeshed co-rotation twin screw is an extruder including two screws that rotate in the same direction inside the cylinder and have intermeshing ratio of from 1.2 to 1.7, and having self-cleaning performance.

In addition, the number of rotations of the screw is set depending on the properties of an apparatus and is not particularly limited, and is preferably from about 50 rpm to about 400 rpm, more preferably from about 80 rpm to about 350 rpm. In this embodiment, for example, when the number of rotations of the screw is increased, the reaction in the upstream section in the extruder can easily proceed, whereby a value for the relative viscosity $\eta 1$ can be easily increased.

In this embodiment, a polyamide oligomer serving as a raw material is supplied from the supply port A3 into the cylinder S, and conveyed to the die D via the conveyance sections E1 to E5 and the kneading sections B1 to B4 while being heated. In this case, the polyamide oligomer is heated and melted in the conveyance sections E1 to E5 and the kneading sections B1 to B4, and kneaded in the kneading sections B1 to B4 for polycondensation, whereby the degree of polymerization thereof is increased, and the resultant polyamide resin is then extruded through the die D.

The strand-like resin extruded from the extruder is generally cooled. As a cooling method for the resin, there are given, for example, an air-cooling method and a water-cooling method involving cooling the resin in a water bath, but the method is not limited thereto. In the case of the water-cooling method, the resin can be cooled rapidly, but the method may require a drying step. In the case of the air-cooling method, the drying step can be omitted, but the method may require some distance for cooling.

In this embodiment, though not particularly limited, the polyamide oligomer serving as the raw material is charged to the supply section A in the form of a powder, a particle, or a pellet.

In order that the polyamide resin or oligomer can be melted, kneaded, and suitably extruded in the cylinder, the temperature at least in a part inside the extruder is controlled to be higher than the melting point of the polyamide resin to be produced, so that the temperature of the resin to be extruded through the die D is higher than the melting point of the polyamide resin to be produced.

The internal temperature of the cylinder may be set to a constant one over all areas, but the cylinder may have an area having a relatively low temperature and an area having a relatively high temperature. For example, the area on the most upstream side may be controlled to have a relatively low temperature and the other area may be controlled to have a relatively high temperature, because the softening temperature of the polyamide increases and the heat resistance thereof improves as the polymerization reaction proceeds. In addition, when the polyamide oligomer needs to be filled into the screw with rapidly softening on the upstream side, the temperature on the upstream side may be controlled to be relatively high, the temperature in the intermediate section may be controlled to be low, and the temperature on the downstream side may be controlled to be higher than that on the upstream side. Further, when the polyamide needs to be prevented from being degraded by heat as much as possible, the temperature on the downstream side may be reduced to a temperature near to the softening temperature of the polyamide not causing any trouble thereon, whereby the resin pressure may be stabilized and the drawability of the strand may be thereby stabilized.

It should be noted that, in any case, in the cylinder S, the temperature at the area on the most upstream side in which the kneading section B1 is arranged to the area on the most downstream side in which the kneading section B4 is arranged is preferably set to a temperature equal to or higher than the melting point of the polyamide resin to be obtained. In addition, the upper limit of the temperature is not particularly limited, and the temperature is preferably not 50° C. or more higher than the melting point, more preferably not 35° C. or more higher than the melting point.

The sites in the screw corresponding to the kneading sections B1 and B2 each include a kneading element X. In addition, the sites corresponding to the kneading sections B3 and B4 each include a kneading element X and a pressure-decreasing element Y positioned downstream of the kneading element X. The kneading element X is appropriately selected from a kneading disc, a rotor, a mixing element, a mixing gear, and the like, as described below. It should be noted that, as the kneading element X, two or more of those elements may be combined to form one kneading element X.

The pressure-decreasing element Y has a pressure-decreasing ability, and increases the filling ratio of the resin or oligomer at the kneading element X in each of the kneading sections B3 and B4. The pressure-decreasing element Y includes a full-flight reverse screw, a sealing disc, or the like. In each of the kneading sections, the pressure-decreasing element Y increases the filling ratio of the resin or oligomer in the section corresponding to the kneading element X, and accordingly, the kneading element X can suitably mix and disperse the resin or the oligomer. Further, the pressure-decreasing element Y allows the melted resin to flow backward with a full-flight screw or blocks the flow of the melted resin with a sealing disc or the like. Accordingly, as described below, the pressure-decreasing element Y can control the area on the downstream side with respect to the pressure-decreasing element Y to be a negative pressure to provide the vacuum area, together with the vacuum vent positioned downstream of the pressure-decreasing element Y. In addition, as described below, the pressure-decreasing element Y in the kneading section B3 seals a vacuum area VA and a preceding area OA.

It should be noted that the kneading sections B1 and B2 are not required to include only the kneading element X and may include the pressure-decreasing element Y on the downstream side with respect to the kneading element X, as in the kneading sections B3 and B4.

In addition, the sites in the screw corresponding to the conveyance sections E1 to E5 each include, for example, a feed screw, such as a full-flight screw element. The screw form may be a single-thread screw, a double-thread screw, or a triple-thread screw, but a double-thread screw is most widely used.

The extruder includes an open vent OV1A (open vent (1A)) and vacuum vents VV1 and VV2 in the cylinder. In the cylinder, the open vent OV1A is arranged on the upstream side, and the vacuum vents VV1 and VV2 are arranged on the downstream side (namely, the die D side).

In addition, as described below, an open vent OV0 (also referred to as "preceding open vent") is preferably further arranged above the supply port or on the upstream end side with respect to the open vent OV1A in the cylinder. It should be noted that the upstream end refers to the end opposite to the end (end on the die side) in which the die is arranged, in the cylinder.

The vacuum vents VV1 and VV2 are each configured to control the pressure inside the extruder to a negative one by suction with a vacuum pump or the like. More specifically, the vacuum vent VV1 is arranged in the conveyance section E4 between the kneading sections B3 and B4, and the vacuum vent VV2 is arranged in the conveyance section E5 between the kneading section B4 and the die D. With this, in the extruder, the area on the downstream side with respect to the pressure-decreasing element Y in the kneading section B3, that is, the area ranging from the conveyance section E4 to the end on the die D side serves as the vacuum area VA by the action of the vacuum vents VV1 and VV2.

It should be noted that the number of the vacuum vents and the positions at which the vacuum vents are arranged in FIG. 3 and FIG. 4 are merely illustrative, and the number and the positions are not limited thereto as long as the extruder includes one or more vacuum vents. Any number of the vacuum vents may be at any position as long as the vacuum area VA that has a predetermined length and a predetermined vacuum degree can be formed.

However, in order to secure the vacuum degree in the area on the downstream side and to increase the molecular weight of the polyamide resin, it is preferred that at least one vacuum vent be arranged in the area of 25% or less of the total screw length from the end on the die D side of the extruder.

Meanwhile, the open vent OV1A is arranged in the area (referred to as preceding area OA) on the downstream side with respect to the supply port A3 and the upstream side with respect to the pressure-decreasing element Y (namely, vacuum area VA) in the kneading section B3. In addition, in the cylinder, no open vent is arranged between the open vent OV1A and the kneading section B3, and the open vent OV1A in this embodiment serves as an open vent arranged on the most downstream side in the preceding area OA.

In addition, in this embodiment, as illustrated in FIG. 3, the supply section A includes, for example, a charge section A1 for charging an oligomer, such as a hopper, a feed section A2 for laterally feeding the oligomer charged from the charge section A1, and a supply port A3 for supplying the oligomer into the cylinder, which is a part for connection to the cylinder. The supply section A includes the feed section A2 and hence can supply the oligomer into the cylinder while controlling the amount of the oligomer charged from the charge section A1. In addition, in the supply section A illustrated in FIG. 3, an open vent OV0 (preceding open vent) is arranged at a position above the supply port A3.

A powder feeder having such form can supply powder stably and can discharge water vapor with high efficiency. A method for measuring the amount in the feeder may be carried out on the basis of volume or on the basis of weight.

The supply section A is preferably a twin-screw-type powder feeder, and in this case, a twin screw is arranged inside the feed section A2. Specific examples of the twin-screw-type powder feeder include a twin-screw-type cassette weighing feeder manufactured by Kubota Corporation and a twin-screw-type feeder manufactured by K-Toron.

It should be noted that, as illustrated in FIG. 4, the feed section A2 may be omitted in the supply section A. In this case, for example, the charge section A1 is arranged above the supply port A3, and the open vent OV0 (preceding open vent) includes a so-called rear vent or the like. Specifically, the open vent OV0 is connected to a position on the upstream end side with respect to the position of the supply port A3 in the cylinder.

It should be noted that, even when the supply section A includes the feed section A2, the open vent OV0 may include so-called rear vent or the like and may be connected to a position on the upstream end side with respect to the position of the supply port A3 in the cylinder.

As described above, in this embodiment, the open vent OV0 is arranged near the supply port A3, and hence water vapor generated near the supply port A3 in the cylinder can be rapidly discharged to the outside of the cylinder so that the reaction can proceed early.

In addition, when a polyamide oligomer having a water content of, for example, 1% by mass or more is used as the oligomer to be charged to the extruder, the amount of water vapor generated by heating and kneading the oligomer in the cylinder increases. Accordingly, when the open vent OV0 is absent near the supply port A3, water vapor may be insufficiently discharged from an open vent OV1A to allow the water vapor to flow backward to the supply section A. However, such backward flow can be prevented by virtue of the presence of the open vent OV0. Accordingly, the water vapor having flowed backward can be prevented from wetting the oligomer to be supplied into the cylinder to cause, for example, aggregation of oligomer particles, which makes it easy to control the amount of the oligomer to be supplied into the cylinder. In addition, failure of feeding, such as lowered meltability of the oligomer after supply into the cylinder, can be prevented, and resin clogging near the supply section can also be prevented.

In addition, the open vent OV0 (preceding open vent) is not limited to be arranged at the position on the upstream end side with respect to the supply port A3 in the cylinder S or the position above the supply section, and for example, the open vent OV0 may be arranged between the open vent OV1A and the supply port A3 in the cylinder S.

Further, when removal of water or the polycondensation reaction do not proceed sufficiently in the upstream section of the cylinder S, two open vents OV0 (preceding open vents) may be arranged. Specifically, the open vent OV0 (preceding open vent) may be arranged at two positions selected from any position on the upstream end side with respect to the open vent OV1A in the cylinder S and a position above the supply port. In this case, one preceding open vent may be arranged at the position above the supply port, while the other preceding open vent (rear vent) may be arranged at the position on the upstream end side with respect to the supply port A3 in the cylinder S.

In addition, the open vent OV0 (preceding open vent) may be appropriately selected from a vent stuffer, a long vent, short vent, and the like.

The polyamide oligomer in this embodiment has a low molecular weight, and the reaction of the polyamide oligomer relatively rapidly proceeds in the upstream section of the cylinder to generate a large amount of water. The large amount of water generated is discharged through the open vent OV0 arranged near the supply port A3 and the open vent OV1A. Accordingly, the dehydration in the cylinder suitably proceeds, and the polycondensation reaction suitably proceeds on the upstream side of the cylinder. Therefore, the relative viscosity η1 of the polyamide resin located below the open vent OV1A can be adjusted to a relatively high one as described below, which makes it easy to decrease the difference between the relative viscosity η1 and the relative viscosity of the polyamide resin to be extruded from the extruder.

In addition, in the downstream section of the extruder, the polyamide resin has a reduced water content and an increased molecular weight. In this case, the downstream section of the extruder is the vacuum area VA, and hence the water content is suitably reduced under the negative pressure therein and thus the reaction proceeds.

In this embodiment, the open vent OV1A (open vent (1A)) is preferably in a pressurized state. The phrase "the open vent OV1A (open vent (1A)) is in a pressurized state" refers to a state in which the pressure inside the cylinder is relatively high, the pressure outside the cylinder is relatively low, and water vapor is discharged from the open vent OV1A. The discharge of the water vapor from the open vent OV1A can be confirmed by visually observing the water vapor. In addition, when a flow rate measured at a height of 1 m above the vent port using an anemometer (Anemomaster LITE Model 6006 manufactured by Kanomax) is 0.1 m/s or more, the open vent OV1A can be determined objectively to be in a pressurized state. In addition, in order to efficiently prevent air from the outside from entering the cylinder, the flow rate is preferably 0.5 m/s or more. In addition, the upper limit of the flow rate is not particularly limited, but is preferably 5 m/s or less in order to prevent the melted resin in the cylinder from being taken in the vent to cause vent-up.

In addition, the open vent OV1A may be any of a short vent and a long vent. For example, when the flow rate may become too high, a long vent may be used.

In this embodiment, the open vent OV1A is brought into a pressurized state, and hence water in the cylinder can be discharged completely. In addition, when the open vent OV1A is brought into a pressurized state, air is hardly taken in from the outside toward the vacuum vent VV1 side via the open vent OV1A, whereby an increase in the yellow index of the resin due to the influence of the air (oxygen) is prevented. Further, inhibition of an increase in the molecular weight of the polyamide resin to be obtained due to a variation in molar ratio can be prevented. In addition, a desired vacuum degree in the vacuum area VA can be achieved more easily.

In addition, in this embodiment, the open vent OV0 (preceding open vent) is also preferably in a pressurized state, whereby water in the cylinder can be discharged more completely and the polycondensation reaction can thereby proceed suitably.

In addition, in this embodiment, in order to more completely discharge water in the oligomer and water generated through the polycondensation reaction from the cylinder S, it is preferred to completely seal the inside of the cylinder in front of the vacuum vent VV1 so that the open vent OV1A is always in a pressurized state.

In this embodiment, when the resin is sufficiently kneaded and allowed to react in the preceding area OA while water is removed in the open vents OV0 and OV1A, the viscosity of the melted resin can be increased sufficiently, whereby the sealing property in the pressure-decreasing element Y in the kneading section B3 can be enhanced sufficiently. This is because a melted resin having a high viscosity is hard to flow through a space between the inner wall of the cylinder and the pressure-decreasing element Y, and hence can sufficiently seal the inside of the cylinder.

In addition, it is preferred that the polyamide oligomer be completely melted before reaching at least the position of the open vent OV1A.

As described above, when the polyamide oligomer is melted before reaching the position of the open vent OV1A, the open vent OV1A is not clogged by the powdery oligomer and water can be actively discharged through the open vent OV1A.

In addition, as illustrated in FIG. 3 and FIG. 4, the open vent OV1A is preferably arranged between the kneading sections B1 and B2. The polyamide oligomer is sufficiently melted when passing through the kneading section B1, and hence the open vent OV1A positioned downstream of the kneading section B1 can prevent the powdery oligomer from causing clogging of the open vent port.

In addition, when the open vent OV1A is arranged on the upstream side with respect to the kneading section B2, the open vent OV1A can be easily kept in a pressurized state. In addition, the polyamide oligomer passes through the open vent OV1A and then reacts sufficiently in the kneading section B2 as well. Therefore, a rapid increase in viscosity in the vacuum area VA can be prevented and surging can be more suitably prevented, in combination with control of a difference in relative viscosity to 0.9 or less, as described below.

Further, it is preferred that no open vent be arranged in the conveyance section E3 adjacent to the kneading section B3. This is because when the open vent is arranged in the conveyance section E3, the open vent is hardly kept in a pressurized state and air is liable to be taken in from the open vent to the vacuum vent VV1 side.

In addition, the length from the open vent OV1A (open vent (1A)) to the most upstream side of the vacuum area VA is preferably from 30% to 50%, more preferably from 34% to 47% of the total screw length. When the length falls within the above-mentioned range, the reaction proceeds suitably before the oligomer reaches the vacuum area VA after passing through the open vent OV1A, and hence a rapid increase in viscosity in the vacuum area VA can be prevented and surging can be more suitably prevented, in combination with control of a difference in relative viscosity to 0.9 or less, as described below.

It should be noted that the position of the open vent OV1A arranged is not particularly limited as long as the open vent OV1A is arranged in the preceding area OA.

Also, in this embodiment, the vacuum area VA is an area of 50% or less of the total screw length. When the vacuum area VA is an area of more than 50%, the polyamide resin may be conveyed to the vacuum area VA in an unmelted or undehydrated state to cause clogging or the like of the vacuum vent, which may make it impossible to keep a suitable vacuum state. In addition, it becomes difficult to control the difference in the relative viscosity to 0.9 or less. From such viewpoints, the length of the vacuum area VA is more preferably 40% or less of the total screw length.

In addition, the length of the vacuum area VA is preferably 10% or more of the total screw length. When the length of the vacuum area VA is 10% or more, dehydration can be sufficiently performed and the water content of the polyamide resin to be obtained can be thereby reduced. In addition, the polycondensation reaction can proceed sufficiently and the molecular weight of the polyamide resin to be obtained can be thereby sufficiently increased. From such viewpoints, the length of the above-mentioned vacuum area VA is preferably 15% or more, more preferably 20% or more.

Also in this embodiment, the vacuum degree in the vacuum area VA is kept at 300 torr or less. When the vacuum degree in the vacuum area VA is more than 300 torr, the oligomer cannot be sufficiently dehydrated and the water content of the polyamide resin to be obtained cannot be sufficiently reduced. In addition, the polycondensation reaction for producing the polyamide resin cannot proceed suitably, and the molecular weight of the polyamide resin may not be sufficiently increased. In addition, the yellow index (YI) of the polyamide resin may be increased.

The vacuum degree in the vacuum area VA is preferably 200 torr or less, more preferably 180 torr or less. When the vacuum degree is such upper limit or less, the water content of the polyamide resin can be further reduced and the polycondensation reaction can proceed more easily.

It should be noted that the lower limit of the vacuum degree is not particularly limited, but the vacuum degree may be generally 1 torr or more in view of the characteristics of an apparatus and the like.

It should be noted that, in this embodiment, the preceding area OA on the upstream side with respect to the vacuum area VA in the extruder is preferably a normal-pressure area that is not substantially under a negative pressure or an area having a slightly higher pressure than normal pressure. It should be noted that, in this area, in general, an inert gas, such as nitrogen, is introduced from the supply section A.

Also in this embodiment, the vacuum degree is measured at each vacuum vent. For example, in the examples of FIG. 1 and FIG. 2, the vacuum vent VV1 is configured to control the supply section E4 and the kneading section B4 to be a negative pressure, and the vacuum degree measured at the vacuum vent VV1 is determined to be the vacuum degree in the supply section E4 and the kneading section B4. Similarly, the vacuum vent VV2 is configured to control the supply section E5 and the inside of the die D to be a negative pressure, and the vacuum degree measured at the vacuum vent VV2 is determined to be the vacuum degree in the supply section E5 and the inside of the die D.

In this embodiment, the difference ($\eta 2 - \eta 1$) in relative viscosity between the relative viscosity $\eta 1$ of the polyamide resin located below the open vent OV1A and the relative viscosity $\eta 2$ of the polyamide resin obtained from the end of the die D (namely, the polyamide resin produced in this embodiment) is 0.9 or less.

In this embodiment, when the difference in relative viscosity ($\eta 2 - \eta 1$) is more than 0.9, the difference between the viscosity in the vacuum area VA and the viscosity in the preceding area OA increases, and the oligomer or resin in the preceding area OA cannot sufficiently deliver the polyamide resin in the vacuum area VA toward the downstream side, which may cause surging. When the surging occurs in the vacuum area VA, the polyamide resin cannot be extruded continuously and stably from the die D. In order to stabilize extrusion of the polyamide resin, the difference in relative viscosity is preferably 0.5 or less.

In addition, the lower limit of the difference ($\eta 2 - \eta 1$) in relative viscosity is not particularly limited. In particular, in order to allow the reaction to proceed suitably in the vacuum area VA, the lower limit is preferably 0.1 or more, more preferably 0.2 or more.

In addition, the relative viscosity $\eta 1$ of the polyamide resin located below the open vent OV1A is preferably 1.6 or more, more preferably 1.8 or more. When the relative viscosity $\eta 1$ is 1.6 or more, the polyamide oligomer or polyamide resin in the preceding area OA can easily deliver the polyamide resin in the vacuum area VA toward the downstream side, which suppresses surging. When the relative viscosity is 1.6 or more, the difference in relative viscosity can be easily controlled to 0.9 or less. In addition, the relative viscosity $\eta 1$ is not particularly limited and may be, for example, 2.5 or less.

According to the second embodiment described above, in the production method for a polyamide resin using an intermeshed co-rotation twin screw, a polyamide resin having excellent physical properties can be extruded stably and continuously, without causing surging or the like.

(Kneading Element)

Next, the kneading element of the kneading section to be used in the first and second embodiments is described in more detail with reference to FIG. 5 to FIG. 9.

In general, mixing of substances is classified into dispersive mixing and distributive mixing. The dispersive mixing means mixing accompanied by a particle size reduction, that is, grinding of particles. The distributive mixing means mixing through rearrangement among particles. Also in the first and second embodiments, the strong dispersive mixing performance means mixing in which a mixing mode accompanied by grinding of a polyamide oligomer or resin particles is dominant. The strong distributive mixing performance means mixing in which a mixing mode with the rearrangement among polyamide oligomer or resin particles is dominant. However, it is not meant that the distributive mixing does not occur when the dispersive mixing occurs, or the dispersive mixing does not occur when the distributive mixing occurs.

As an element having strong dispersive mixing performance, there are given, for example, a kneading disc having a large disc width (see FIG. 5), a rotor (see FIGS. 6A and 6B) among the kneading elements listed above, but the element is not limited thereto. It should be noted that the kneading disc includes a combination of a plurality of discs. The kneading disc having a large disc width is one in which the ratio W/D of a disc width W to a screw diameter D is 0.15 or more and 1.5 or less.

Figures 6A, 6B:
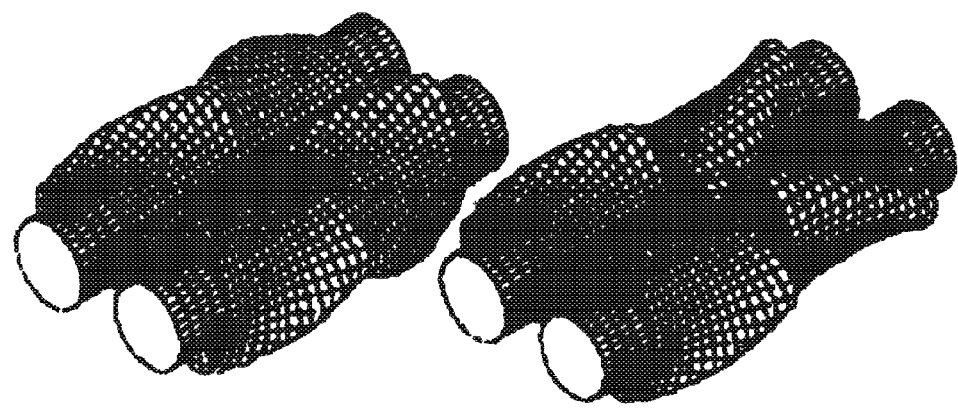
FIGS. 6A and 6B are perspective views for illustrating a rotor to be used in the present invention, FIG. 6A being a perspective view for illustrating a continuous rotor, FIG. 6B being a perspective view for illustrating a discontinuous rotor.
Figure 7:
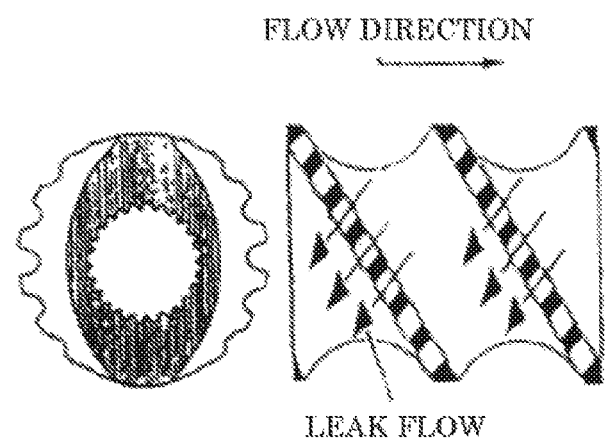
FIG. 7 shows a cross-sectional view and a side view for illustrating of an SME mixing element to be used in the present invention.
Figure 8:
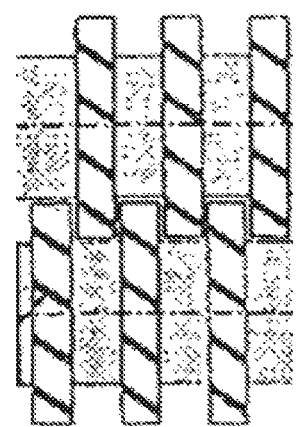
FIG. 8 is a side view for illustrating a mixing gear to be used in the present invention.
Figure 9:
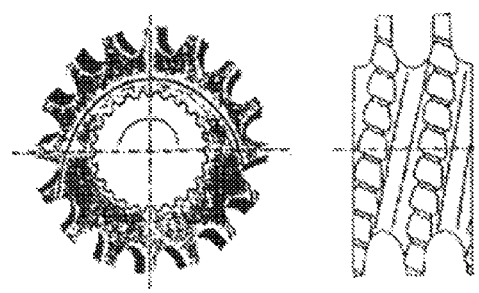
FIG. 9 shows a cross-sectional view and a side view for illustrating a ZME mixing element to be used in the present invention.

In addition, as an element having strong distributive mixing performance, there are given, for example, a kneading disc having a small disc width in which the ratio W/D of the disc width W to the screw diameter D is 0.02 or more and less than 0.15, a rotor illustrated in FIGS. 6A and 6B, a mixing element illustrated in FIG. 7, and a mixing gear illustrated in FIG. 8, but the element is not limited thereto. It should be noted that the mixing element may be an SME mixing element in which a full-flight forward screw disc is notched as illustrated in FIG. 7, or may be a ZME mixing element in which a full-flight reverse screw disc is notched as illustrated in FIG. 9. In addition, the mixing gear may or may not have self-cleaning performance. Further examples of the mixing element include mixing elements in which two or three spiral kneading blades are arranged in a circumferential direction, as typified by a rotor segment and a VCMT rotor segment manufactured by Kobe Steel, Ltd.

In addition, the rotor has a feature of being capable of applying uniform shear stress to a material, although the maximum shear stress to be applied to a material is small, as compared to the kneading disc. Accordingly, as described above, the rotor has both relatively strong distributive mixing performance and relatively strong dispersive mixing performance. It should be noted that the rotor may be of a continuous type as illustrated in FIG. 6A where the cross section smoothly continues, or may be of a discontinuous type as illustrated in FIG. 6B where the cross section is formed discontinuously.

In the first and second embodiments, the kneading element X in each of the kneading sections (the kneading sections B1 to B3 in FIG. 1 to FIG. 4) positioned upstream of the vacuum area VA (that is, positioned in the preceding area OA) is preferably selected from the above-mentioned elements having strong dispersive mixing performance, and is more preferably the kneading disc having a large disc width. In this case, one or more of the kneading sections positioned upstream of the vacuum area VA may include the kneading disc having a large disc width, and all of those kneading sections preferably include the kneading disc having a large disc width.

It should be noted that the kneading disc having a large disc width to be used in the kneading element X in the preceding area OA has a ratio W/D of preferably 0.2 or more, more preferably 0.3 or more. Such increased ratio W/D further enhances the dispersive mixing performance.

In the first and second embodiments, the screw having strong dispersive mixing performance is used as the kneading element X in the preceding area OA, whereby the shear force can be increased and the raw material polyamide copolymer in a powder form or the like can be brought into a homogeneously mixed state at the position on a relatively upstream side of the extruder.

In addition, the kneading element X in the kneading section in the vacuum area VA (the kneading section B4 in FIG. 1 to FIG. 4) is preferably the element having strong distributive mixing performance described above, and is more preferably the mixing element. When the screw having strong distributive mixing performance is used in the kneading section in the vacuum area VA as described above, excessive shear force can be prevented from being applied to the polyamide resin or oligomer to thereby prevent excess heat generation, whereby the YI of the resin can be prevented from increasing, for example. In addition, water can be easily removed during the polymerization reaction and the molecular weight of the resin can be easily increased. In addition, gelation or the like can be prevented and the molecular weight of the resin can be prevented from lowering.

In the area of 25% or less of the total screw length from the end on the die D side of the extruder, one or more kneading sections each including an element having strong distributive mixing performance are preferably arranged. The kneading sections are arranged in the vacuum area VA, and for example, the kneading section B4 is arranged in the examples of FIG. 1 to FIG. 4. In that manner, in first and second embodiments, an element having strong distributive mixing performance is arranged at a predetermined position on the downstream side, and therefore, the balance between the dispersive mixing and the distributive mixing becomes satisfactory. Accordingly, in the first and second embodiments, excessive shear force can be prevented from being applied to the resin, and a good-quality polyamide having a high molecular weight, a low water content, a suitably narrow molecular weight, and a small yellow index distribution can be produced.

EXAMPLES

Now, the present invention is described in more detail by way of Examples, but the present invention is not limited to these Examples.

It should be noted that, in the following Examples,
poly-1,3-bis(aminomethyl)cyclohexaneadipamide is referred to as "N-1,3-BAC6",
poly-1,4-bis(aminomethyl)cyclohexaneadipamide is referred to as "N-1,4-BAC6",
poly-1,4-bis(aminomethyl)cyclohexanesebacamide is referred to as "N-1,4-BAC10",
poly-1,3-bis(aminomethyl)cyclohexaneterephthalamide is referred to as "N-1,3-BACT",
polymetaxylyleneadipamide is referred to as "N-MXD6", and
polyparaxylylenesebacamide is referred to as "N-PXD10".

The (1) relative viscosity, (2) water content, (3) yellow index, (4) molecular weight distribution (Mw/Mn), and (5) glass transition temperature and melting point of each of the polyamide oligomer and the polyamide resin were measured as described below. In addition, the (6) thermal stability and (7) extrudability of the polyamide resin were evaluated as described below.

(1) Relative Viscosity 0.2 g of the polyamide oligomer or the polyamide resin was precisely weighed and dissolved in 20 ml of 96% sulfuric acid at from 20° C. to 30° C. with stirring. After completion of the dissolution, 5 ml of the solution was quickly placed in a Cannon Fenske-type viscometer, and allowed to stand in a thermostat chamber at 25° C. for 10 minutes, and then the dropping time (t) was measured. In addition, the dropping time ($t_0$) of 96% sulfuric acid was measured in the same manner. The relative viscosity was calculated from t and $t_0$ according to the following equation.

$$\text{Relative Viscosity} = t/t_0$$

It should be noted that the relative viscosity η1 of the polyamide resin located below the open vent was measured using a sample taken by, during extrusion of the polyamide resin, once stopping the rotation of the extruder and inserting a bar from the open vent OV1A.

(2) Water Content

Through use of a trace-level water content measurement device AQ-2000 manufactured by Hiranuma Sangyo Co., Ltd., the water content was measured in a nitrogen atmosphere at 230° C. for 30 minutes.

(3) Yellow Index (YI)

Through use of a colorimeter Z-Σ80 manufactured by Nippon Denshoku Industries Co., Ltd., the yellow index was measured according to a transmission method according to ASTM D1003.

(4) Molecular Weight Distribution (Mw/Mn)

The number-average molecular weight (Mn), the weight-average molecular weight (Mw), and the molecular weight distribution (Mw/Mn) were determined according to gel permeation chromatography (GPC). Specifically, "HLC-8320GPC" manufactured by Tosoh Corporation was used as an apparatus and two columns "TSK gel Super HM-H"

manufactured by Tosoh Corporation were used as columns. Hexafluoroisopropanol (HFIP) having a sodium trifluoroacetate concentration of 10 mmol/L was used as an eluent. As the conditions for molecular weight distribution measurement, the resin or oligomer concentration was 0.02% by mass, the column temperature was 40° C., the flow rate was 0.3 ml/min, and a refractive index detector (RI) was used. It should be noted that the molecular weights of the resin and the oligomer were determined as values in terms of standard polymethyl methacrylate.

(5) Glass Transition Temperature and Melting Point

Through use of a differential scanning calorimeter (trade name: DSC-60, manufactured by Shimadzu Corporation), the sample was subjected to DSC measurement in a nitrogen stream at a temperature increase rate of 10° C./min, and the glass transition temperature (Tg) and the melting point (Tm) thereof were determined.

(6) Thermal Stability

The thermal stability of the polyamide resin was evaluated based on a melt viscosity measured using a capilograph (trade name: Capilograph 1D, manufactured by Toyo Seiki Seisaku-Sho, Ltd.). Specifically, the measurement was carried out as described below.

The melt viscosity of the polyamide resin at a shear rate of 122 sec$^{-1}$ was measured under the following measuring conditions.

—Measuring Conditions—

Amount of polyamide resin: 20 g

Preset Temperature: A temperature higher by 20° C. than the melting point of the polyamide resin to be measured.

Residence time: Set the time every 2 minutes (for example, 6 min, 8 min, 10 min, . . . ).

Capillary: 1 mm in diameter×10 mm in height

In the measurement as described above, the time for retaining the melt viscosity of the polyamide resin measured when the residence time was set to 6 minutes (referred to as "η6") was measured. The retention time of the melt viscosity η6 for each residence time was determined, and the longest retention time is shown in Table 2. As the retention time of the melt viscosity η6 becomes longer, the thermal stability of the polyamide resin becomes more excellent.

(7) Evaluation of Extrudability

The extrudability of a resin extruded from the die of each of Examples and Comparative Examples was evaluated based on the following criteria.

A: The polyamide resin was able to be extruded stably and continuously from a die.

B: The polyamide resin was able to be extruded continuously while the diameter of a strand varied.

C: The polyamide resin could not be extruded stably from a die owing to intermittent extrusion.

The polyamide oligomer serving as the raw material for the polyamide resin was produced by the methods of the following Production Examples 1 to 7.

(Production Example 1) Production of Polyamide Oligomer 1

9,000 g (61.58 mol) of accurately-weighed adipic acid (manufactured by Asahi Kasei Chemicals Corporation), 8,759.8 g (61.58 mol) of 1, 4-bis(aminomethyl)cyclohexane having a trans ratio of 62 mol % (manufactured by Koei Chemical Company, Limited), 12.7 g (0.0746 mol) of calcium hypophosphite, 4.90 g (0.0597 mol) of sodium acetate, and 6,241 g of distilled water were charged into a pressure-resistant reaction vessel having an internal volume of 50 L and equipped with a stirrer, a partial condenser, a total condenser, a pressure regulator, a thermometer, a driptank with a pump, an aspirator, a nitrogen-introducing pipe, a bottom drain valve, and a receiving pot for flushing an oligomer, and the reaction vessel was fully purged with nitrogen, and then sealed up and heated up to 220° C. with stirring. In this stage, the internal pressure was 2.3 MPa. This was kept stirred for 2 hours at 220° C. under the internal pressure kept at 2.3 MPa. Subsequently, the stirring was stopped, and then the ball valve of the bottom drain valve was opened to normal pressure in 90 seconds, and the slurry oligomer was taken out into the receiving pot through flushing. After that, the resultant was dried at 150° C. for 5 hours using a vacuum drier, thereby giving 18 kg of a powdery oligomer of N-1,4-BAC6 (polyamide oligomer 1). The phosphorus atom-containing compound concentration in the polyamide oligomer 1 was 300 ppm in terms of phosphorus atom concentration.

(Production Example 2) Production of Polyamide Oligomer 2

A powdery oligomer of N-1,4-BAC10 (polyamide oligomer 2) was obtained in the same manner as in Production Example 1 except that sebacic acid (manufactured by Itoh Oil Chemicals Co., Ltd.) was used as the dicarboxylic acid component, and 1,4-bis(aminomethyl)cyclohexane having a trans ratio of 80 mol % (manufactured by Koei Chemical Company, Limited) was used as the diamine component. The phosphorus atom-containing compound concentration in the polyamide oligomer 2 was 300 ppm in terms of phosphorus atom concentration.

(Production Example 3) Production of Polyamide Oligomer 3

A powdery oligomer of N-1,3-BAC6 (polyamide oligomer 3) was obtained in the same manner as in Production Example 1 except that 1,3-bis(aminomethyl)cyclohexane having a cis ratio of 70 mol % (manufactured by Mitsubishi Gas Chemical Company, Inc.) was used as the diamine component, sodium hypophosphite was used in place of calcium hypophosphite, the amount of sodium hypophosphite was 15.8 g (0.149 mol), and the amount of sodium acetate was 9.76 g (0.119 mol). The phosphorus atom-containing compound concentration in the polyamide oligomer 3 was 300 ppm in terms of phosphorus atom concentration.

(Production Example 4) Production of Polyamide Oligomer 4

A powdery oligomer of N-PXD10 (polyamide oligomer 4) was obtained in the same manner as in Production Example 1 except that paraxylylenediamine (manufactured by Showa Denko K.K.) was used as the diamine component and sebacic acid (manufactured by Itoh Oil Chemicals Co., Ltd.) was used as the dicarboxylic acid component. The phosphorus atom-containing compound concentration in the polyamide oligomer 4 was 300 ppm in terms of phosphorus atom concentration.

(Production Example 5) Production of Polyamide Oligomer 5

A powdery oligomer of N-1,3-BACT (polyamide oligomer 5) was obtained in the same manner as in Production Example 1 except that 1,3-bis(aminomethyl)cyclohexane having a cis ratio of 70 mol % (manufactured by Mitsubishi Gas Chemical Company, Inc.) was used as the diamine component, and high-purity terephthalic acid (manufactured by Mizushima Aroma Co., Ltd.) was used as the dicarboxylic acid component. The phosphorus atom-containing compound concentration in the polyamide oligomer 5 was 300 ppm in terms of phosphorus atom concentration.

(Production Example 6) Production of Polyamide Oligomer 6

A powdery oligomer of N-MXD6 (polyamide oligomer 6) was obtained in the same manner as in Production Example 1 except that metaxylylenediamine (manufactured by Mitsubishi Gas Chemical Company, Inc.) was used as the diamine component, adipic acid (manufactured by Asahi Kasei Corporation) was used as the dicarboxylic acid component, sodium hypophosphite was used in place of calcium hypophosphite, the amount of sodium hypophosphite was 0.0735 mol, and the amount of sodium acetate was 0.0588 mol. The phosphorus atom-containing compound concentration in the polyamide oligomer 6 was 150 ppm in terms of phosphorus atom concentration.

(Production Example 7) Production of Polyamide Oligomer 7

A powdery oligomer of N-1,4-BAC6 (polyamide oligomer 7) was obtained in the same manner as in Production Example 1 except that the drying condition with the vacuum drier was at 150° C. and for 2 hours.

The measurement results of the relative viscosity, the water content, and the yellow index of the polyamide oligomers 1 to 7 are shown in Table 1.

screw length, D: screw diameter) was 64.6, and the cylinder diameter φ in the vertical direction in the front view of the cylinder was 26 mm.

Example 1

Figure 10:
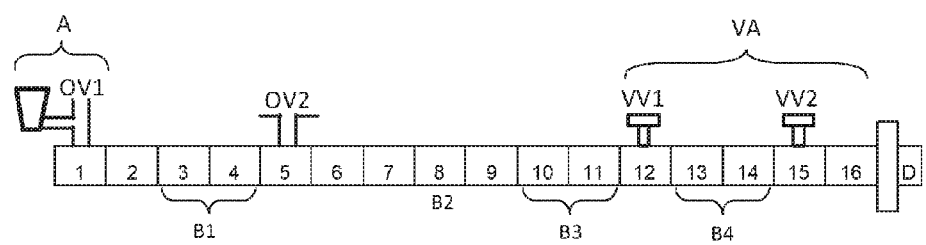
FIG. 10 is a schematic view for illustrating an extruder used in Examples 1 to 6 and Comparative Example 1.

FIG. 10 is a schematic view for illustrating the extruder used in Example 1.

As illustrated in FIG. 10, the extruder used in Example 1 included 17 barrels (including a die D) connected to each other, which included a 1st barrel including a supply section A including: a charge section including a hopper; a feed section including a twin screw; and a supply port above which an open vent OV1 was arranged. Among the barrels, an open vent OV2 was arranged in the 5th barrel from the supply section A side, and vacuum vents VV1 and VV2 were arranged in the twelfth and fifteenth barrels, respectively. In addition, in the 3rd and 4th barrels and 8th barrel, a kneading disc element having a large disc width was arranged in the screws, thereby providing kneading sections B1 and B2, respectively. In the 10th and 11th barrels, a kneading disc element having a large disc width was arranged in the screws, and a full-flight reverse screw was connected thereto on the most downstream side, thereby providing one kneading section B3. In the 13th and 14th barrels, a mixing element was arranged in the screws, and a full-flight reverse screw was connected thereto on the downstream side thereof, thereby providing a kneading section B4. Accordingly, the 12th to 17th barrels formed a vacuum area VA, and the length thereof was 35% of the total screw length. The screws in the other barrels than those of the kneading sections B1 to B4 were double-thread flight screw elements to form conveyance sections. In addition, when the total distance from the most upstream side of the vacuum area VA to the upstream end in the cylinder was defined as 100%, the

TABLE 1

| | | Unit | Production Example 1 | Production Example 2 | Production Example 3 | Production Example 4 | Production Example 5 | Production Example 6 | Production Example 7 |
|---|---|---|---|---|---|---|---|---|---|
| | | | \multicolumn{7}{c|}{No. of Polyamide oligomer} | | | | | | |
| | | | 1 | 2 | 3 | 4 | 5 | 6 | 7 |
| Aromatic diamine | Metaxylylenediamine | mol | | | | | | 61.58 | |
| | Paraxylylenediamine | mol | | | | 61.58 | | | |
| Alicyclic diamine | 1,3-Bis(aminomethyl)cyclohexane | mol | | | 61.58 | | 61.58 | | |
| | 1,4-Bis(aminomethyl)cyclohexane | mol | 61.58 | 61.58 | | | | | 61.58 |
| Aliphatic dicarboxylic acid | Adipic acid | mol | 61.58 | | 61.58 | | | 61.58 | 61.58 |
| | Sebacic acid | mol | | 61.58 | | 61.58 | | | |
| Aromatic dicarboxylic acid | Terephthalic acid | mol | | | | | 61.58 | | |
| Relative viscosity | | | 1.1 | 1.1 | 1.2 | 1.1 | 1.1 | 1.1 | 1.1 |
| Water content | | wt % | 1.3 | 1.3 | 1.5 | 1.3 | 1.2 | 0.9 | 4.2 |
| Phosphorous atom concentration | | ppm | 300 | 300 | 300 | 300 | 300 | 150 | 300 |
| Yellow index | | | 4.2 | 4.5 | 5.1 | 4.4 | 3.1 | 3.4 | 3.2 |

Next, in Examples 1 to 6 and Comparative Examples 1 and 2, through use of an extruder, each of the above-mentioned polyamide oligomers 1 to 6 was melt-kneaded to obtain a polyamide resin through polycondensation. It should be noted that TEM-26SS manufactured by Toshiba Machine Co., Ltd., in which a plurality of barrels were assembled to construct one extruder, was used in Examples and Comparative Examples. This extruder includes an intermeshed co-rotation twin screw, in which the ratio L/D (L:

open vent OV2 was arranged at a position upstream by 63% with respect to the most upstream side of the vacuum area VA.

Under the extrusion conditions to be described below, the polyamide oligomer 1 was charged from the supply port into the extruder via the hopper of the supply section A, using the twin screw in the feed section, and the reaction through extrusion was carried out while dry nitrogen was always introduced into the extruder through the hopper, thereby obtaining a polyamide resin 1. The temperature of the melted resin extruded from the die D (hereinafter referred to as "temperature of the resin at the outlet") was 305° C. In addition, the extrusion condition is as described below.

It should be noted that, during the extrusion, water vapor jetted upward in the open vents OV1 and OV2. The flow rate of water vapor was measured at a height of 1 m above the open vents OV1 and OV2 with an anemometer (Anemomaster LITE Model 6006 manufactured by Kanomax). Accordingly, the flow rate of the water vapor discharged from the vent port was found to be from 0.8 m/s to 1.2 m/s, which suggested that the OV1 and OV2 were in a pressurized state.

<Extrusion Conditions>
Feeder Rate: 5 kg/h
Screw Rotation Number: 280 rpm
Preset Temperature (° C.): C1 to C13/C14 to C16/C17=310/300/300
Vacuum Degrees in Vacuum Vents VV1 and VV2 were 300 torr and 30 torr, respectively.
* It should be noted that C1 to C17 represent the preset temperatures in the 1st to 17th barrels, respectively. C17 represents the preset temperature in a die.

Example 2

A polyamide resin 2 was obtained in the same manner as in Example 1 except that the polyamide oligomer 2 was used and reaction through extrusion was carried out under the extrusion conditions to be described below. The temperature of the resin at the outlet was 310° C.
<Extrusion Conditions>
Feeder Rate: 5 kg/h
Screw Rotation Number: 280 rpm
Preset Temperature (° C.): C1/C2 to C16/C17=240/300/300
Vacuum Degrees in Vacuum Vents VV1 and VV2 were 300 torr and 100 torr, respectively.

Example 3

A polyamide resin 3 was obtained in the same manner as in Example 1 except that the polyamide oligomer 3 was used and reaction through extrusion was carried out under the extrusion conditions to be described below. The temperature of the resin at the outlet was 242° C.
<Extrusion Conditions>
Feeder Rate: 5 kg/h
Screw Rotation Number: 280 rpm
Preset Temperature (° C.): C1/C2 to C16/C17=220/250/250
Vacuum Degrees in Vacuum Vents VV1 and VV2 were 200 torr and 100 torr, respectively.

Example 4

A polyamide resin 4 was obtained in the same manner as in Example 1 except that the polyamide oligomer 4 was used and reaction through extrusion was carried out under the extrusion conditions to be described below. The temperature of the resin at the outlet was 305° C.
<Extrusion Conditions>
Feeder Rate: 5 kg/h
Screw Rotation Number: 280 rpm
Preset Temperature (° C.): C1/C2 to C16/C17=260/300/300

Vacuum Degrees in Vacuum Vents VV1 and VV2 were 90 torr for both of VV1 and VV2.

Example 5

A polyamide resin 5 was obtained in the same manner as in Example 1 except that the polyamide oligomer 5 was used and reaction through extrusion was carried out under the extrusion conditions to be described below. The temperature of the resin at the outlet was 360° C.
<Extrusion Conditions>
Feeder Rate: 5 kg/h
Screw Rotation Number: 280 rpm
Preset Temperature (° C.): C1/C2 to C16/C17=320/350/350
Vacuum Degrees in Vacuum Vents VV1 and VV2 were 160 torr for both of VV1 and VV2.

Example 6

A polyamide resin 6 was obtained in the same manner as in Example 1 except that the polyamide oligomer 6 was used and reaction through extrusion was carried out under the extrusion conditions to be described below. The temperature of the resin at the outlet was 261° C.
<Extrusion Conditions>
Feeder Rate: 5 kg/h
Screw Rotation Number: 280 rpm
Preset Temperature (° C.): C1/C2 to C16/C17=240/260/260
Vacuum Degrees in Vacuum Vents VV1 and VV2 were 96 torr for both of VV1 and VV2.

Comparative Example 1

A polyamide resin 1 was obtained in the same manner as in Example 1 except that the reaction through extrusion was carried out using a polyamide oligomer 1 under the extrusion conditions to be described below and the full-flight reverse screw in the kneading section B3 was removed. The flow rate of water vapor was measured with an anemometer (Anemomaster LITE Model 6006, by Kanomax). The flow rate at the vent port was 0 m/s, and water vapor from the open vent OV2 was not detected.

It should be noted that, in Comparative Example 1, the vacuum degrees in the barrels 12 to 14 could not be secured sufficiently as described below, and the barrels 15 to 17 formed the vacuum area VA, which was 18% of the total screw length.
<Extrusion Conditions>
Feeder Rate: 5 kg/h
Screw Rotation Number: 280 rpm
Preset Temperature (° C.): C1 to C13/C14 to C16/C17=310/300/300
Vacuum Degrees in Vacuum Vents VV1 and VV2 were 750 torr and 100 torr, respectively.

Comparative Example 2

Figure 11:
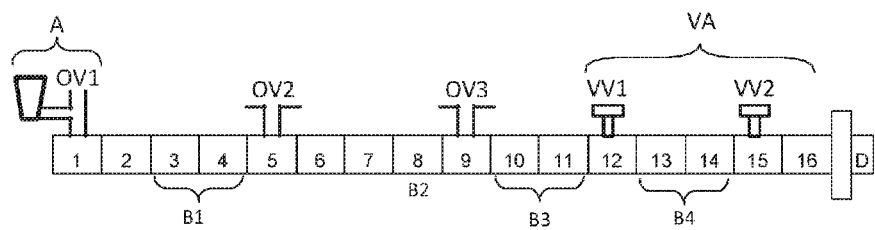
FIG. 11 is a schematic view for illustrating an extruder used in Comparative Example 2.

FIG. 11 is a schematic view for illustrating the extruder used in Comparative Example 2.

As illustrated in FIG. 11, the extruder used in Comparative Example 2 included 17 barrels (including a die D) connected to each other, which included a 1st barrel in which the supply section A was arranged like that in Example 1. Among the 17 barrels, open vents $OV2_1$ and $OV2_2$ were arranged in the 5th and 9th barrels from the supply section A side, respectively, and vacuum vents VV1 and VV2 were arranged in the 12th and 15th barrels, respectively. In addition, in the 3rd and 4th barrels and the 8th barrel, a kneading disc element having a large disc width was arranged in the screws, thereby providing kneading sections B1 and B2, respectively. In addition, in the 10th and 11th barrels, a kneading disc element having a large disc width was arranged in the screws, and a full-flight reverse screw was connected thereto on the most downstream side, thereby providing one kneading section B3. In the 13th and 14th barrels, a mixing element was arranged in the screws, and a full-flight reverse screw was connected thereto on the downstream side thereof, thereby providing a kneading section B4.

The screws in the other barrels than those of the kneading sections B1 to B4 were double-thread flight screw elements to form conveyance sections. When the total distance from the upstream end to the most upstream side of the vacuum area VA in the cylinder was defined as 100%, the open vent $OV2_2$ was arranged at a position upstream by 27% with respect to the most upstream side of the vacuum area VA.

Under the extrusion conditions to be described below, the polyamide oligomer 1 was charged into the extruder through the hopper of the supply section A, and the reaction through extrusion was carried out while dry nitrogen was always introduced into the extruder through the hopper, thereby obtaining a polyamide resin 1. The flow rate of water vapor was measured at a position above the vent ports of $OV2_1$ and $OV2_2$ with an anemometer (Anemomaster LITE Model 6006 manufactured by Kanomax). The water vapor from the $OV2_1$ was detected, while the water vapor from the $OV2_2$ was not detected.

It should be noted that, in Comparative Example 2, the vacuum degrees in the 12th to 14th barrels could not be secured sufficiently, and the 15th to 17th barrels formed the vacuum area VA at 300 torr or less, which was 18% of the total screw length.

<Extrusion Conditions>
  Feeder Rate: 5 kg/h
  Screw Rotation Number: 280 rpm
  Preset Temperature (° C.): C1 to C13/C14 to C16/C17=310/300/300
  Vacuum Degrees in Vacuum Vents VV1 and VV2 were 750 torr and 100 torr, respectively.

The relative viscosity, the water content, the yellow index, the glass transition temperature, and the melting point of each of the polyamide resins obtained in Examples 1 to 6 and Comparative Examples 1 and 2 were measured to evaluate thermal stability of each of the polyamide resins. The results are shown in Table 2.

Polyamide resins each having a sufficiently increased molecular weight, a small yellow index, a satisfactory color tone, and excellent thermal stability were obtained by the methods of Examples 1 to 6. On the other hand, polyamide resins obtained by the methods of Comparative Examples 1 and 2 each had a poor color tone, and an unstable viscosity during measurement of the melt viscosity as compared to the polyamide resins obtained by the methods of Examples 1 to 6.

Next, in Examples 7 to 12 and Comparative Examples 3 and 4, polyamide oligomers 1 to 7 were melt-kneaded using the extruder to produce polyamide resins through polycondensation. It should be noted that, in these Examples and Comparative Examples, TEM-26SS manufactured by Toshiba Machine Co., Ltd. was used in the same manner as in Examples 1 to 6 and Comparative Examples 1 and 2.

Example 7

Figure 12:
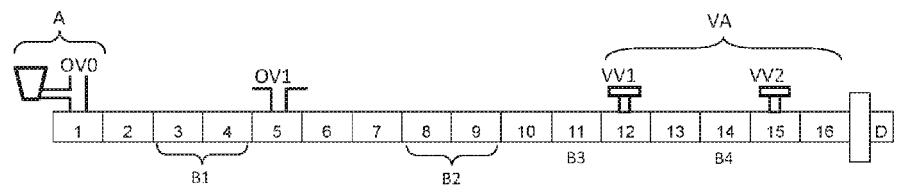
FIG. 12 is a schematic view for illustrating an extruder used in Examples 7 to 12 and Comparative Example 3.

FIG. 12 is a schematic view for illustrating the extruder used in Example 7.

As illustrated in FIG. 12, the extruder used in Example 7 included 17 barrels (including a die D) connected to each other, which included a 1st barrel including a supply section A including: a charge section including a hopper, a feed section including a twin screw; and a supply port above which an open vent OV0 was arranged. Among the barrels, an open vent OV1A was arranged in the 5th barrel from the supply section A side, vacuum vents VV1 and VV2 were arranged in the 12th and 15th barrels, respectively, and a die D was used as the 17th barrel. In addition, in the 3rd and 4th barrels and the 8th and 9th barrels, a kneading disc element having a large disc width was arranged in the screws, thereby providing kneading sections B1 and B2, respectively. In addition, in the 11th barrel, a kneading disc element having a large disc width was arranged in the screw, and a full-flight reverse screw was connected thereto on the downstream side, thereby providing one kneading section B3. In the 14th barrel, a mixing element was arranged in the screw, and a full-flight reverse screw was connected thereto on the downstream side thereof, thereby providing a kneading section B4. Accordingly, the 12th to 17th barrels formed a vacuum area VA, and the length thereof was 35% of the total screw length. The screws in the other barrels than those of the kneading sections B1 to B4 were double-thread flight screw elements to form conveyance sections.

In addition, the length from the open vent OV1A to the most upstream side of the vacuum area VA was 41% of the total screw length.

TABLE 2

|  |  |  | Example | | | | | | Comparative Example | |
|---|---|---|---|---|---|---|---|---|---|---|
|  |  |  | 1 | 2 | 3 | 4 | 5 | 6 | 1 | 2 |
|  |  |  | No. of polyamide oligomer charged into extruder | | | | | | | |
|  |  | Unit | 1 | 2 | 3 | 4 | 5 | 6 | 1 | 1 |
| Properties | Relative Viscosity |  | 2.2 | 2.3 | 2.0 | 2.4 | 2.1 | 2.5 | 1.8 | 1.9 |
|  | Water content | % | 0.05 | 0.06 | 0.05 | 0.04 | 0.06 | 0.05 | 0.05 | 0.05 |
|  | Yellow index | ° C. | 18 | 16 | 5 | 22 | 19 | 3 | 100 | 70 |
|  | Thermal stability | min | 16 | 24 | 30 | 20 | 14 | 30 | N.D. | N.D. |
| Thermal properties | Glass transition temperature Tg | ° C. | 112 | 93 | 103 | 74 | 187 | 87 | 112 | 112 |
|  | Melting point Tm | ° C. | 301 | 270 | 232 | 290/281 | 349 | 237 | 301 | 301 |

*N.D. = Not Detected

Under the extrusion conditions to be described below, the polyamide oligomer 1 was charged from the supply port into the extruder via the hopper of the supply section A, using the twin screw in the feed section, and the reaction through extrusion was carried out while dry nitrogen was always introduced into the extruder through the hopper, thereby obtaining a polyamide resin 7. The temperature of the melted resin extruded from the die D (hereinafter referred to as "temperature of the resin at the outlet") was 309° C. The extrusion conditions are as described below.

It should be noted that, during the extrusion, water vapor jetted upward in the open vents OV0 and OV1A. The flow rate of water vapor was measured at a height of 1 m above the open vents OV0 and OV1A with an anemometer (Anemomaster LITE Model 6006 manufactured by Kanomax). Accordingly, the flow rate of the water vapor discharged from the vent port was found to be from 0.8 m/s to 1.2 m/s, which suggested that the OV0 and OV1A were in a pressurized state.
<Extrusion Conditions>
  Feeder Rate: 10 kg/h
  Screw Rotation Number: 300 rpm
  Preset Temperature (° C.): C1/C2/C3 to C14/C15/C16/C17=260/320/310/300/300/300
  Vacuum Degrees in Vacuum Vents VV1 and VV2 were 150 torr for both of VV1 and VV2.
* It should be noted that C1 to C17 represent the preset temperatures in the 1st to 17th barrels, respectively. C17 represents the preset temperature in a die.

Example 8

A polyamide resin 8 was obtained in the same manner as in Example 7 except that the polyamide oligomer 2 was used and reaction through extrusion was carried out under the extrusion conditions to be described below. The temperature of the resin at the outlet was 318° C. In addition, ejection of water vapor from the open vents OV0 and OV1A was observed in the same manner as in Example 7. When the flow rate of the water vapor was measured using the anemometer, the flow rate was found to be from 0.9 m/s to 1.4 m/s, which suggested that the open vents OV0 and OV1A were in a pressurized state.
<Extrusion Conditions>
  Feeder Rate: 20 kg/h
  Screw Rotation Number: 200 rpm
  Preset Temperature (° C.): C1/C2/C3 to C14/C15/C16/C17=240/300/300/290/290/290
  Vacuum Degrees in Vacuum Vents VV1 and VV2 were 100 torr for both of VV1 and VV2.

Example 9

A polyamide resin 9 was obtained in the same manner as in Example 7 except that the polyamide oligomer 3 was used and reaction through extrusion was carried out under the extrusion conditions to be described below. The temperature of the resin at the outlet was 247° C. In addition, ejection of water vapor from the open vents OV0 and OV1A was observed in the same manner as in Example 7. When the flow rate of the water vapor was measured using the anemometer, the flow rate was found to be from 0.8 m/s to 1.4 m/s, which suggested that the open vents OV0 and OV1A were in a pressurized state.
<Extrusion Conditions>
  Feeder Rate: 10 kg/h
  Screw Rotation Number: 100 rpm
  Preset Temperature (° C.): C1/C2/C3 to C14/C15/C16/C17=220/250/250/240/240/240
  Vacuum Degrees in Vacuum Vents VV1 and VV2 were 100 torr for both of VV1 and VV2.

Example 10

A polyamide resin 10 was obtained in the same manner as in Example 7 except that the polyamide oligomer 4 was used and reaction through extrusion was carried out under the extrusion conditions to be described below. The temperature of the resin at the outlet was 305° C. In addition, ejection of water vapor from the open vents OV0 and OV1A was observed in the same manner as in Example 7. When the flow rate of the water vapor was measured using the anemometer, the flow rate was found to be from 1.0 m/s to 1.5 m/s, which suggested that the open vents OV0 and OV1A were in a pressurized state.
<Extrusion Conditions>
  Feeder Rate: 20 kg/h
  Screw Rotation Number: 200 rpm
  Preset Temperature (° C.): C1/C2/C3 to C14/C15/C16/C17=260/300/300/290/290/290
  Vacuum Degrees in Vacuum Vents VV1 and VV2 were 90 torr for both of VV1 and VV2.

Example 11

A polyamide resin 11 was obtained in the same manner as in Example 7 except that the polyamide oligomer 5 was used and reaction through extrusion was carried out under the extrusion conditions to be described below. The temperature of the resin at the outlet was 364° C. In addition, ejection of water vapor from the open vents OV0 and OV1A was observed in the same manner as in Example 7. When the flow rate of the water vapor was measured using the anemometer, the flow rate was found to be from 0.9 m/s to 1.5 m/s, which suggested that the open vents OV0 and OV1A were in a pressurized state.
<Extrusion Conditions>
  Feeder Rate: 10 kg/h
  Screw Rotation Number: 100 rpm
  Preset Temperature (° C.): C1/C2/C3 to C14/C15/C16/C17=320/350/350/350/350/350
  Vacuum Degrees in Vacuum Vents VV1 and VV2 were 160 torr for both of VV1 and VV2.

Example 12

A polyamide resin 12 was obtained in the same manner as in Example 7 except that the polyamide oligomer 6 was used and reaction through extrusion was carried out under the extrusion conditions to be described below. The temperature of the resin at the outlet was 265° C. In addition, ejection of water vapor from the open vents OV0 and OV1A was observed in the same manner as in Example 7. When the flow rate of the water vapor was measured using the anemometer, the flow rate was found to be from 0.8 m/s to 1.4 m/s, which suggested that the open vents OV0 and OV1A were in a pressurized state.
<Extrusion Conditions>
  Feeder Rate: 30 kg/h
  Screw Rotation Number: 200 rpm
  Preset Temperature (° C.): C1/C2/C3 to C14/C15/C16/C17=240/260/260/240/240/240

Vacuum Degrees in Vacuum Vents VV1 and VV2 were 96 torr for both of VV1 and VV2.

Comparative Example 3

Reaction through extrusion was attempted by the same method as in Example 7 except that the polyamide oligomer 7 was used and the reaction through extrusion was carried out under the extrusion condition to be described below. However, owing to the high water content of the polyamide oligomer, a large amount of water jetted out from the open vents and water vapor flowed backward in the hopper direction, and the powdery oligomer caused a problem of vent-up inside the extruder and caked therein and could not be extruded.
<Extrusion Conditions>
  Feeder Rate: 10 kg/h
  Screw Rotation Number: 200 rpm
  Preset Temperature (° C.): C1/C2/C3 to C14/C15/C16/C17=260/320/310/300/300/300
  Vacuum Degree in Vacuum Vents VV1 and VV2: Vacuuming was impossible.

Comparative Example 4

Figure 13:
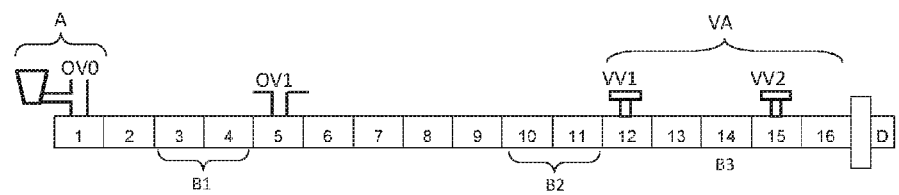
FIG. 13 is a schematic view for illustrating an extruder used in Comparative Example 4.

FIG. 13 is a schematic view for illustrating the extruder used in Comparative Example 4.

As illustrated in FIG. 13, the extruder used in Comparative Example 4 includes the same supply section A as that in Example 7 and includes an open vent OV0 above the supply port. The extruder includes 17 barrels (including a die D) connected to each other, which includes a 1st barrel including the supply section A. Among the 17 barrels, an open vent OV1A was arranged in the 5th barrel from the supply section A side, vacuum vents VV1 and VV2 were arranged in the 12th and 15th barrels, respectively, and a die D was used as the 17th barrel. In addition, in the 3rd and 4th barrels, a kneading disc element having a large disc width was arranged in the screws, thereby providing a kneading section B1. In addition, in the 10th and 11th barrels, a kneading disc element having a large disc width was arranged in the screws, and a full-flight reverse screw was connected thereto on the downstream side thereof, thereby providing one kneading section B2. In the 14th barrel, a rotor was provided in the screw, and a full-flight reverse screw was connected thereto on the downstream side thereof, thereby providing a kneading section B3.

The screws in the other barrels than those of the kneading sections B1 to B3 were double-thread flight screw elements to form conveyance sections.

In addition, the length from the open vent OV1A to the most upstream side of the vacuum area VA was 41% of the total screw length.

Under the extrusion conditions to be described below, the polyamide oligomer 1 was charged from the supply port into the extruder via the hopper of the supply section A using a feeder, and the reaction through extrusion was carried out while dry nitrogen was always introduced into the extruder through the hopper. However, the resin was extruded intermittently owing to surging, and hence the polyamide resin could not be extruded stably from the die. This is because there was a large difference in relative viscosity ($\eta 2-\eta 1$) between the relative viscosity ($\eta 1$) of the polyamide resin located below the open vent OV1A and the relative viscosity ($\eta 2$) of the polyamide resin discharged from the die. Specifically, this was caused by the following reasons. The reaction proceeded insufficiently in the upstream section of the extruder owing to a small screw rotation number to inhibit an increase in the molecular weight of the polyamide resin located below the open vent OV1A.

In addition, ejection of water vapor from the open vents OV0 and OV1A was observed in the same manner as in Example 7. When the flow rate of the water vapor was measured using the anemometer, the flow rate was found to be from 1.0 m/s to 1.4 m/s, which suggested that the open vents OV0 and OV1A were in a pressurized state.
<Extrusion Conditions>
  Feeder Rate: 10 kg/h
  Screw Rotation Number: 200 rpm
  Preset Temperature (° C.): C1/C2/C3 to C14/C15/C16/C17=260/320/310/300/300/300
  Vacuum Degrees in Vacuum Vents VV1 and VV2 were 72 torr for both of VV1 and VV2.

The relative viscosity, the water content, the yellow index, the glass transition temperature, and the melting point of each of the polyamide resins obtained in Examples 7 to 12 and Comparative Examples 3 and 4 were measured to evaluate thermal stability of each of the polyamide resins. The results are shown in Table 3.

TABLE 3

| | | | | Example | | | | | | Comparative Example | |
|---|---|---|---|---|---|---|---|---|---|---|---|
| | | | | 7 | 8 | 9 | 10 | 11 | 12 | 3 | 4 |
| | | | | No. of Polyamide oligomer charged into extruder | | | | | | | |
| | | | Unit | 1 | 2 | 3 | 4 | 5 | 6 | 7 | 1 |
| Properties | Relative viscosity | $\eta 1$ | | 1.8 | 1.8 | 1.8 | 1.8 | 1.8 | 1.9 | Not extruded | 1.5 |
| | | $\eta 2$ | | 2.3 | 2.4 | 2.1 | 2.5 | 2.3 | 2.6 | | 2.6 |
| | | $\eta 2 - \eta 1$ | | 0.5 | 0.6 | 0.3 | 0.7 | 0.5 | 0.7 | | 1.1 |
| | Water content | | % | 0.05 | 0.06 | 0.05 | 0.04 | 0.06 | 0.05 | | 0.04 |
| | Yellow index | | | 16 | 13 | 3 | 22 | 17 | 2 | | 20 |
| | Number-average molecular weight (Mn) | | | 24,653 | 35,984 | 23,556 | 38,567 | 24,550 | 40,053 | | 38,956 |
| | Weight-average molecular weight (Mw) | | | 44,789 | 67,453 | 44,321 | 79,345 | 44,804 | 84,560 | | 80,345 |
| | Mw/Mn | | | 1.8 | 1.9 | 1.9 | 2.1 | 1.8 | 2.1 | | 2.1 |
| | Thermal properties | Glass transition temperature Tg | ° C. | 112 | 93 | 103 | 74 | 187 | 87 | | 112 |
| | | Melting point Tm | ° C. | 301 | 270 | 232 | 290/281 | 349 | 237 | | 301 |
| Extrudability evaluation | | | | A | B | A | B | A | B | | C |

According to the methods of Examples 7 to 12, polyamide resins each having a sufficiently increased molecular weight, a small yellow index, and a satisfactory color tone were able to be obtained. On the other hand, according to the methods of Comparative Examples 3 and 4, the resin could not be extruded or was extruded intermittently from the extruder, and the polyamide resins could not be obtained stably.

REFERENCE SIGNS LIST

A: supply section
A3: supply port
B1 to B4: kneading section
D: die
E1 to E4: conveyance section
OV1: open vent (1)
OV2: open vent (2)
OV1A: open vent (1A)
OV0: open vent (preceding open vent)
S: cylinder
VA: vacuum area
VV1, VV2: vacuum vent
X: kneading element
Y: pressure-decreasing element

The invention claimed is:

1. A polyamide resin production method for producing a polyamide resin through polycondensation of a polyamide oligomer using an extruder including an intermeshed co-rotation twin screw within a cylinder, the polyamide oligomer comprising: a diamine unit comprising 70 mol % or more of a diamine unit selected from an aromatic diamine unit represented by the following general formula (I-1) and an alicyclic diamine unit represented by the following general formula (I-2); and a dicarboxylic acid unit comprising 50 mol % or more of a dicarboxylic acid unit selected from a linear aliphatic dicarboxylic acid unit represented by the following general formula (II-1) and an aromatic dicarboxylic acid unit represented by the following general formula (II-2), the production method comprising supplying the polyamide oligomer having a relative viscosity of from 1.1 to 1.3 and a water content of 3% by mass or less from a supply port into the cylinder and melt-kneading the polyamide oligomer in the cylinder to produce the polyamide resin through polycondensation, wherein the relative viscosity is measured using 0.2 g of the polyamide oligomer in 20 ml of 96% sulfuric acid at 25° C., the extruder comprising an open vent (1), an open vent (2), and a vacuum vent, the open vent (1) being arranged at at least one of a position above the supply port or a position on an upstream end side with respect to a position of the supply port in the cylinder, the extruder further comprising a pressure-decreasing element arranged on an upstream side with respect to a position of the vacuum vent, the open vent (2) being arranged on a side downstream with respect to the position of the supply port in the cylinder and upstream with respect to a position of the pressure-decreasing element, the open vent (2) being brought into a pressurized state, an area of 50% or less of a total screw length of the extruder comprising a vacuum area at 300 torr or less:

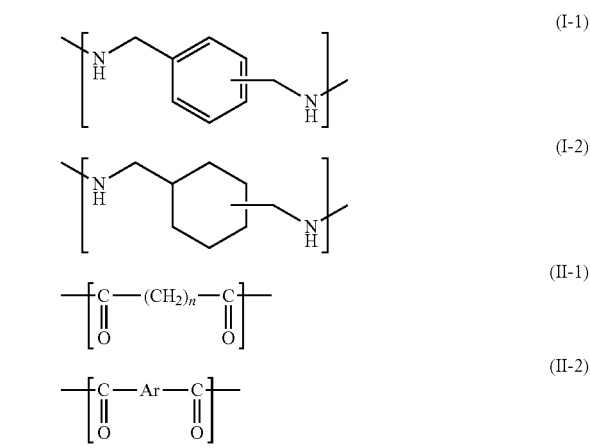

wherein, in the general formula (II-1), n represents an integer of from 2 to 18, and in the general formula (II-2), Ar represents an arylene group.

2. The polyamide resin production method according to claim 1, wherein the extruder comprises only one open vent (2), which is the only open vent on the side downstream with respect to the position of the supply port in the cylinder and upstream with respect to the position of the pressure-decreasing element.

3. The polyamide resin production method according to claim 1, wherein a relative viscosity of the polyamide resin is from 1.8 to 4.0, wherein the relative viscosity is measured using 0.2 g of the polyamide resin in 20 ml of 96% sulfuric acid at 25° C.

4. The polyamide resin production method according to claim 1, wherein the polyamide oligomer has blended therein a phosphorus compound at a phosphorus atom concentration of from 10 ppm to 500 ppm.

5. The polyamide resin production method according to claim 1, wherein a kneading section for kneading the polyamide oligomer is arranged both in the vacuum area and at a position on an upstream side with respect to the vacuum area.

6. The polyamide resin production method according to claim 1, wherein at least one vacuum vent is arranged in an area of 25% or less of the total screw length from an end on a die side of the extruder.

7. The polyamide resin production method according to claim 1, wherein a kneading section comprises a kneading disc in which the ratio W/D of a disc width W to a screw diameter D is 0.02 or greater and less than 0.15, and is arranged in an area of 25% or less of the total screw length from an end on a die side of the extruder.

8. The polyamide resin production method according to claim 1, wherein a kneading section for kneading the polyamide oligomer is arranged at a position on an upstream side with respect to the vacuum area and the kneading section comprises a kneading disc in which the ratio W/D of a disc width W to a screw diameter D is 0.15 or greater and less than or equal to 1.5.

9. A polyamide resin production method for producing a polyamide resin through polycondensation of a polyamide oligomer using an extruder including an intermeshed co-rotation twin screw within a cylinder, the polyamide oligomer comprising: a diamine unit comprising 70 mol % or more of a diamine unit selected from an aromatic diamine unit represented by the following general formula (I-1) and an alicyclic diamine unit represented by the following general formula (I-2); and a dicarboxylic acid unit comprising 50 mol % or more of a dicarboxylic acid unit selected from a linear aliphatic dicarboxylic acid unit represented by the following general formula (II-1) and an aromatic dicarboxylic acid unit represented by the following general formula (II-2), the production method comprising supplying the polyamide oligomer having a water content of 3% by mass or less from a supply port into the cylinder and melt-kneading the polyamide oligomer in the cylinder to produce the polyamide resin through polycondensation, the extruder comprising, in the cylinder, a vacuum vent, a pressure-decreasing element arranged on an upstream side with respect to a position of the vacuum vent, and an open vent (1A) arranged on a side downstream with respect to the supply port and upstream with respect to the pressure-decreasing element, an area of 50% or less of a total screw length of the extruder comprising a vacuum area at 300 torr or less, a difference between a relative viscosity of a polyamide resin located below the open vent (1A) and a relative viscosity of a polyamide resin extruded from the extruder being 0.9 or less, wherein the relative viscosity is measured using 0.2 g of the polyamide resin in 20 ml of 96% sulfuric acid at 25° C.:

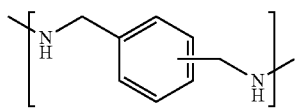 (I-1)

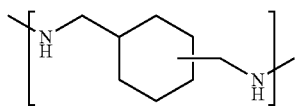 (I-2)

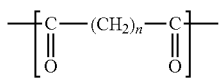 (II-1)

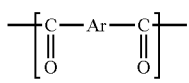 (II-2)

wherein, in the general formula (II-1), n represents an integer of from 2 to 18, and in the general formula (II-2), Ar represents an arylene group.

10. The polyamide resin production method according to claim 9, wherein the relative viscosity of the polyamide resin located below the open vent (1A) is 1.6 or more.

11. The polyamide resin production method according to claim 9, wherein the extruder further comprises a preceding open vent at at least one of a position above the supply port or a position on an upstream end side with respect to the open vent (1A) in the cylinder.

12. The polyamide resin production method according to claim 9, wherein a relative viscosity of the polyamide oligomer is from 1.1 to 1.3, wherein the relative viscosity is measured using 0.2 g of the polyamide oligomer in 20 ml of 96% sulfuric acid at 25° C.

13. The polyamide resin production method according to claim 9, wherein the open vent (1A) is in a pressurized state.

14. The polyamide resin production method according to claim 9, wherein a relative viscosity of the polyamide resin is from 1.8 to 4.0.

15. The polyamide resin production method according to claim 9, wherein a molecular weight distribution (Mw/Mn) of the polyamide resin is from 1.8 to 2.5.

16. The polyamide resin production method according to claim 9, wherein the polyamide oligomer has blended therein a phosphorus compound at a phosphorus atom concentration of from 10 ppm to 500 ppm.

17. The polyamide resin production method according to claim 9, wherein a kneading section for kneading the polyamide oligomer is arranged both in the vacuum area and at a position on an upstream side with respect to the vacuum area.

18. The polyamide resin production method according to claim 9, wherein at least one vacuum vent is arranged in an area of 25% or less of the total screw length from an end on a die side of the extruder.

19. The polyamide resin production method according to claim 9, wherein a kneading section comprises a kneading disc in which the ratio W/D of a disc width W to a screw diameter D is 0.02 or greater and less than 0.15, and is arranged in an area of 25% or less of the total screw length from an end on a die side of the extruder.

20. The polyamide resin production method according to claim 9, wherein a kneading section for kneading the polyamide oligomer is arranged at a position on an upstream side with respect to the vacuum area and the kneading section comprises a kneading disc in which the ratio W/D of a disc width W to a screw diameter D is 0.15 or greater and less than or equal to 1.5.

* * * * *